United States Patent
Jang

[11] Patent Number: 5,957,809
[45] Date of Patent: Sep. 28, 1999

[54] HYDRAULIC CONTROL SYSTEM FOR AUTOMATIC TRANSMISSIONS TO IMPROVE SHIFT QUALITY

[75] Inventor: Jaeduk Jang, Kyungki-do, Rep. of Korea

[73] Assignee: Hyundai Motor Company, Seoul, Rep. of Korea

[21] Appl. No.: 08/911,800

[22] Filed: Aug. 15, 1997

[30] Foreign Application Priority Data

Nov. 19, 1996 [KR] Rep. of Korea ................ 96-55074
Nov. 19, 1996 [KR] Rep. of Korea ................ 96-55075

[51] Int. Cl.⁶ .................................................. F16H 61/08
[52] U.S. Cl. ............................................................ 477/149
[58] Field of Search ........................... 475/128, 127; 477/144, 149

[56] References Cited

U.S. PATENT DOCUMENTS

| | | | |
|---|---|---|---|
| 4,563,917 | 1/1986 | Higashi et al. | 477/149 |
| 4,569,253 | 2/1986 | Higashi et al. | 477/149 |
| 4,607,542 | 8/1986 | Sugano | 477/144 |
| 4,617,841 | 10/1986 | Sugano | 477/144 |
| 4,742,732 | 5/1988 | Hiramatsu | 477/149 |
| 5,010,788 | 4/1991 | Sugano et al. | 477/149 |
| 5,094,130 | 3/1992 | Hirose et al. | 477/149 |
| 5,634,865 | 6/1997 | Jang | 475/128 |
| 5,707,318 | 1/1998 | Shimei et al. | 477/149 |

*Primary Examiner*—Dirk Wright
*Attorney, Agent, or Firm*—Birch, Stewart, Kolasch & Birch, LLP

[57] ABSTRACT

A hydraulic control system for an automatic transmission includes a pressure regulator to regulate hydraulic pressure produced by an oil pump; a manual and automatic shift controller to form shift modes; and a hydraulic pressure controller to regulate shift quality and responsiveness such that shift modes are smoothly formed during shifting. A damper clutch controller operates a damper clutch of a torque converter. A hydraulic pressure distributor supplies and distributes appropriate amounts of hydraulic pressure to friction members that operate as input and reaction members in each shift stage.

11 Claims, 17 Drawing Sheets

HYDRAULIC CONTROL SYSTEM FOR AUTOMATIC TRANSMISSIONS TO IMPROVE SHIFT QUALITY

BACKGROUND

The present invention relates to a hydraulic control system for automatic transmissions.

Generally, a conventional automatic transmission used in vehicles includes a torque converter, a multi-stage shift gear mechanism connected to the torque converter, and a plurality of friction members, which are actuated by hydraulic pressure, for selecting one of the gear stages of the shift gear mechanism.

A hydraulic control system for automatic transmissions used in vehicles operates by the selection of friction members using hydraulic pressure, created by the pumping of oil by a hydraulic pump, passing through a control valve. As a result, shifting can be realized automatically and appropriate to the driving state of the vehicle.

The above hydraulic control system is realized including pressure regulating means for regulating hydraulic pressure created in a hydraulic pump, manual and automatic shift control means for forming a shift mode, hydraulic pressure control means for controlling shift quality and shift response for the forming of a smooth shift mode during shifting, damper clutch control means for operation of a torque converter damper clutch, and hydraulic distribution means for dispersing an appropriate amount of hydraulic pressure to each of the friction members.

In the hydraulic control system structured as in the above, through the ON/OFF and duty control of solenoid valves by a transmission control unit (TCU), hydraulic distribution of the hydraulic distribution means is changed and friction members to be operated are selected, realizing the control of shift stages.

However, in the above hydraulic control system, as line pressure is controlled according to the operation of the damper clutch, precise control of line pressure is difficult when the damper clutch slips during beginning and middle points of shifting, and a problem arises wherein line pressure varies with the operation of the damper clutch.

Further, when controlling shifting from one shift stage to another, shift quality is greatly affected by how precise the timing is to release hydraulic pressure operating on one friction member and supply it to a new friction member.

Also, in the prior art hydraulic control system, engine rpms can quickly increase, the shift mechanism can become interlocked, and the engine can briefly change into a neutral state.

Designs are offered in the prior art in which shift-valve structure is changed to improve shift quality by controlling the timing supplying hydraulic pressure, but these changes result in the drawback of complicating shift valve structure.

SUMMARY

The present invention has been made in an effort to solve the above problems.

It is an object of the present invention to provide a hydraulic control system for automatic transmissions which makes shift control easy by realizing control of line pressure in third and fourth shift ranges independent from the operation a damper clutch, prevents a planetary gear set from interlocking when a transmission control unit (TCU) is malfunctioning, and realizes shifting by the independent control of friction members when skip shifting from a fourth speed to a second speed.

To achieve the above object, the present invention provides a hydraulic control system for automatic transmissions comprising pressure regulating means for regulating hydraulic pressure produced in an oil pump, manual and automatic shift control means for forming a shift mode, hydraulic pressure control means for regulating shift quality and responsiveness such that shift modes are smoothly formed during shifting, damper clutch control means for operating a damper clutch of a torque converter, and hydraulic pressure distribution means for supplying and distributing an appropriate amount of hydraulic pressure to first, second, third, fourth, and fifth friction members which operate as input and reaction members in each shift stage.

The above hydraulic pressure distribution means includes a 1-2 shift valve, controlled by a second speed pressure of a shift control valve of the manual and automatic shift control means which supplies hydraulic pressure, supplied from a first pressure control valve, to a control switch valve and a 2-3/4-3 shift valve; the control switch valve, having means for regulating the timing to which hydraulic pressure is supplied to the third friction member and the timing to control the second friction member, operating as a reaction member in second and fourth speeds, and when 4-2 downshifting, the control switch valve changes operational pressure of an operational side chamber of the second friction member to second speed pressure, and uses operational pressure of the third friction member as control pressure of the first pressure control valve to control release pressure; a fail-safe valve, controlled by hydraulic pressure supplied to first, second, third, and fourth friction members and which controls the hydraulic pressure supplied to the operational side chamber of the second friction member; a high-low pressure valve, controlled by receiving control pressure from a timing control line by the ON/OFF control of solenoid valves, and after third, fourth speed shifting is completed, supplies third speed pressure to a pressure regulator valve to allow change of line pressure; the 2-3/4-3 shift valve, controlled by third and fourth speed pressure in third and fourth speeds, and which selectively supplies hydraulic pressure received from the 1-2 shift valve and from a 3-4 shift valve in a reverse R shift range to the fourth friction member and a release side chamber of the second friction member; and the 3-4 shift valve, controlled by fourth speed pressure of the shift control valve, which in first, second, and third speeds supplies hydraulic pressure supplied from a second pressure control valve to the first friction member, and in the fourth speed, is controlled by the supply of fourth speed pressure to the 2-3/4-3 shift valve such that the hydraulic pressure supplied to the release side chamber of the second friction member and to the fourth friction member is interrupted and, at the same time, release pressure is able to be controlled.

The 1-2 shift valve is realized through a port, which receives second speed pressure from the shift control valve; a port, connected to the first pressure control valve of the hydraulic pressure control means and to a reverse second control line; a port, which supplies hydraulic pressure received from the first pressure control valve to the 2-3/4-3 shift valve, control switch valve, and the fail-safe valve; and a port for supplying hydraulic pressure received from the reverse second control line to the fifth friction member.

Also, the control switch valve is comprised of a port, controlled by a solenoid valve and which receives control pressure from the timing control line connected to a first speed line; a port, which receives hydraulic pressure from the 1-2 shift valve and second and third speed lines of the shift control valve; and a port, which selectively supplies hydraulic pressure received from the above ports to the fail-safe valve and the third friction member.

Further, the third speed line communicating with the control switch valve has formed a circulation line including an orifice, and a mounted check valve for interrupting the hydraulic pressure supplied to the control switch valve.

In addition, the fail-safe valve is comprised of two ports, communicating with the control switch valve; a port, connected to a second speed line of the shift control valve; a port, which receives part of the hydraulic pressure supplied to the first friction member; a port, receiving part of the hydraulic pressure supplied to the release side chamber of the second friction member and to the fourth friction member; a port for receiving second speed pressure; and a port, which supplies the hydraulic pressure supplied from the control switch valve to the operational side chamber of the second friction member.

The above high-low valve is comprised of a port, communicating with the timing control line; a port, which receives third speed pressure by communicating with the third speed line; and a port, supplying the third speed pressure, received as in the above, to the pressure regulator valve.

Also, the 2-3/4-3 shift valve is comprised of a port connected to the third speed line; a port connected to a fourth speed line through the 3-4 shift valve; a port, communicating with the 1-2 shift valve to receive hydraulic pressure; a port, communicating with the reverse first control line; and a port, communicating with and receiving hydraulic pressure from the release side chamber of the second friction member and the fourth friction member.

According to another feature of the present invention, the 3-4 shift valve is comprised of a port for receiving hydraulic pressure from the fourth speed line and supplying it to the 2-3/4-3 shift valve; a port, communicating with the second pressure control valve; two ports for supplying hydraulic pressure received from the reverse first control line to the 2-3/4-3 shift valve; and a port, which supplies hydraulic pressure received from the second pressure control valve to the first friction member.

The 3-4 shift valve, controlled by fourth speed pressure, supplies the hydraulic pressure supplied to the second pressure control valve to the first friction member in first, second, and third speeds; when 3-4 shifting, directly exhausts the hydraulic pressure supplied to the second friction member; and when 3-4 and 3-2 shifting, exhausts the hydraulic pressure, supplied to the release side chamber of the second friction member and the second friction member, through the manual valve via the 2-3/4-3 shift valve and the reverse first control line.

Further, the 3-4 shift valve is comprised of two ports, for supplying hydraulic pressure received from the fourth speed line to the 2-3/4-3 shift valve; a port, communicating with the second pressure control valve; two ports, communicating with the reverse first control line and, at the same time, with the 2-3/4-3 shift valve; a port, for supplying hydraulic pressure received from the second pressure control valve to the first friction member; and two ports of a circulation line which circulates the hydraulic pressure supplied to the port receiving hydraulic pressure from the first friction member.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION

Preferred embodiments of the present invention will now be described in detail with reference to the accompanying drawings.

Figure 1:
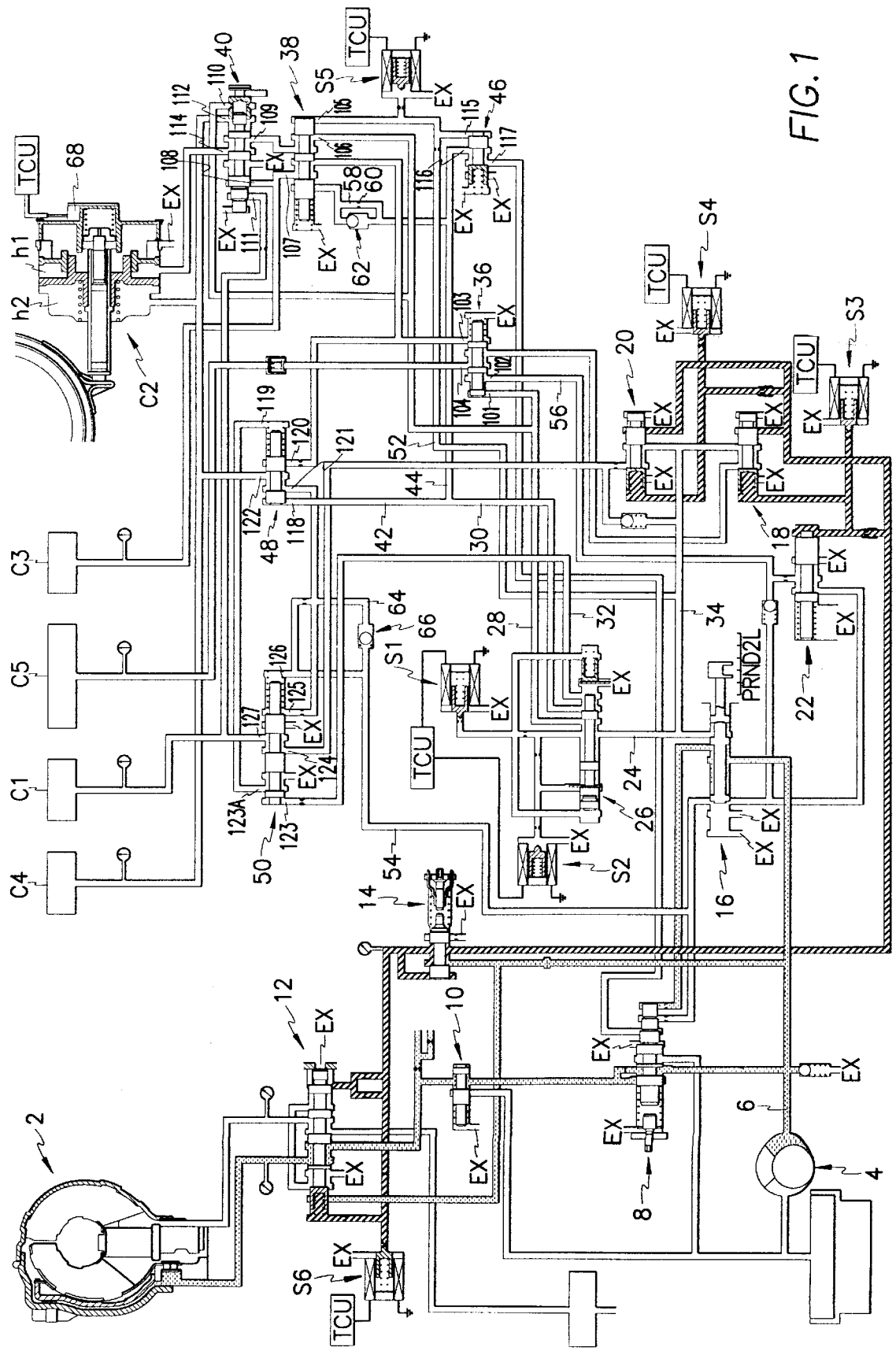
FIG. 1 is a hydraulic circuit diagram illustrating the flow of hydraulic pressure in a neutral N range in a hydraulic control system according to a first embodiment of the present invention.

Referring to FIG. 1, the hydraulic control system according to a preferred embodiment of the present invention includes a torque converter 2, which receives power from an engine, converts it to torque, and transmits the torque toward a transmission; and an oil pump 4, which pumps oil to create and discharge hydraulic pressure needed for the torque converter 2, control of shift stages, and lubrication.

Formed on a line 6, through which hydraulic pressure created by the pumping of oil by the oil pump 4 flows, to comprise pressure regulating means and damper clutch control means are a pressure regulator valve 8, which makes constant in the line 6 the pressure created in the oil pump 4; a torque converter control valve 10, which regulates the pressure of the oil for the torque converter 2 and for lubrication to a predetermined level; and a damper clutch control valve 12, for increasing power transmission efficiency of the torque converter 2.

Also, lines are formed to supply part of the hydraulic pressure to a reducing valve 14, which maintains hydraulic pressure at a level lower than line pressure, and to a manual valve 16, which operates according to the positioning of a select lever (not shown) by a driver to change the flow of hydraulic pressure to different lines.

Hydraulic pressure control means is provided for supplying pressure, reduced in the reducing valve 14, to a first pressure control valve 18 and a second pressure control valve 20 to be used as control pressure for the shift ranges.

Further, lines are formed to enable part of the hydraulic pressure supplied to the first and second pressure control valves 18 and 20 to be used as control pressure for an N-R control valve 22, which reduces shift shock when shifting from a neutral N range to a reverse R range.

The manual and automatic shift control means, communicating with a shift control valve 26 which changes lines by the operation of first and second solenoid valves S1 and S2 ON/OFF controlled by the TCU, are interconnected to a line 24, through which hydraulic pressure flows when the manual valve 16 is in a drive D range, and to the manual valve 16.

A second speed line 28, a third speed line 30, and a fourth speed line 32 are connected to the shift control valve 26 to enable the supply of control pressure to shift valves of the hydraulic pressure distribution means for control of each of the shift stages.

Further, a first speed line 34 is branched off from the line 24 to allow the supply of line pressure to the first and second pressure control valves 18 and 20. The first and second pressure control valves 18 and 20 are formed to allow line conversion by a third and a fourth solenoid valves S3 and S4 such that the first pressure control valve 18 allows for control pressure to be supplied to friction members when shifting, and the second pressure control valve 20 enables the supply of drive pressure to a first friction member C1, operating as an input member in a first speed range.

The second speed line 28 of the shift control valve 26 supplies hydraulic pressure to a left-side port of a 1-2 shift valve 36 and controls the same, and, at the same time, supplies hydraulic pressure to a control switch valve 38 and a fail-safe valve 40. The hydraulic pressure supplied to the control switch valve 38 is supplied as operational pressure to an operational side chamber h1 of a second friction member C2 according to control of the control switch valve 38.

Also, the third speed line 30 is divided into two separate branch lines 42 and 44. The first branch line 42 is connected to a left-side port of a 2-3/4-3 shift valve 48 and controls the same, and the second branch line 44 is further divided, with one division connected to the control switch valve 38 such that hydraulic pressure is supplied to a third friction member C3, and the other division connected to a high-low pressure valve 46. This enables the supply of hydraulic pressure to the pressure regulator valve 8 of the pressure regulating means.

The fourth speed line 32 communicates with a left side port of a 3-4 shift valve 50, and a right side port of the 2-3/4-3 shift valve 48.

In addition, a timing control line 52 is connected to the first speed line 34 to allow first speed pressure, flowing through this line, to be used as control pressure by the control switch valve 38 and the high-low pressure valve 46. The flow of the first speed pressure is controlled by a fifth solenoid valve S5 mounted on the timing control line 52.

Further, the present invention is structured such that when the manual valve 16 is in the reverse "R" range, hydraulic pressure supplied to a reverse first control line 54 is able to be supplied to a fourth friction member C4 through the 3-4 shift valve 50 and the 2-3/4-3 shift valve 48, and, at the same time, hydraulic pressure supplied to a reverse second control line 56 is supplied to a fifth friction member C5, operating as a reaction member in the reverse shift range, through the 1-2 shift valve 36.

In the above, part of the hydraulic pressure supplied to the fourth friction member C4 is simultaneously supplied to a release side chamber h2 of the second friction member C2.

With regard to the valves forming the hydraulic pressure distribution means, the 1-2 shift valve 36 is controlled by second speed pressure of the shift control valve 26, and the hydraulic pressure supplied from the first pressure control valve 18 is supplied to the control switch valve 38 and the 2-3/4-3 shift valve 48 and to their respective friction members.

Also, lines are formed to enable the hydraulic pressure supplied to the reverse second control line 56 to be supplied directly to the fifth friction member C5.

The above 1-2 shift valve 36 is realized through a first port 101, which receives second speed pressure from the shift control valve 26; a second port 102, connected to the first pressure control valve 18 of the hydraulic pressure control means and to the reverse second control line 56; a third port 103, which supplies hydraulic pressure received from the first pressure control valve 18 to the 2-3/4-3 shift valve 48, control switch valve 38, and the fail-safe valve 40; and a fourth port 104 for supplying hydraulic pressure received from the reverse second control line 56 to the fifth friction member C5. The hydraulic pressure supplied to the fail-safe valve 40 in the above is supplied as control pressure.

The control switch valve 38 receives control pressure from the first pressure control valve 18 after passing through the 1-2 shift valve 36, and second and third line pressure from the shift control valve 26 by the control pressure of the fifth solenoid valve S5 which controls the hydraulic pressure supplied from the first speed line 34.

The hydraulic pressure supplied to the fail-safe valve 40 in the above is selectively supplied to the operational side chamber h1 of the second friction member C2.

Further, the control switch valve 38 has means to control the timing of the supply of hydraulic pressure to the third friction member C3 and means to adjust the control timing of the second friction member C2 which operates as a reaction member in the second and fourth speeds. When 4-2 downshifting, this allows for the replacing of operational pressure of the operational side chamber h1 of the second friction member C2 with second speed pressure, and for using operational pressure of the third pressure member C3 as control pressure of the first friction control valve 18 such that release pressure is able to be controlled.

Accordingly, the control switch valve 38 is realized through a first port 105, which receives control pressure from the timing control line 52 connected to the first speed line 34; a second port 106, which receives hydraulic pressure from the 1-2 shift valve 36 and the second and third speed lines 28 and 30 of the shift control valve 26; and a third port 107, which selectively supplies hydraulic pressure received from the first and second 105 and 106 ports to the fail-safe valve 40 and the third friction member C3. The first port 105 receiving hydraulic pressure from the first speed line 34 is structured such that it is controlled by the fifth solenoid valve S5.

A circulation line 58 having an orifice 60 is formed on the third speed line 30, the third speed line 30 communicating with the control switch valve 38. Further, a check valve 62 is formed on the third speed line 30 for blocking the hydraulic pressure supplied to the control switch valve 38.

As a result of the above, when driving in first and second speeds, if the TCU malfunctions or if each valve sticks to hold in the third speed, the hydraulic pressure supplied to the third friction member C3 is blocked by the orifice 60 such that only the first and fourth friction members C1 and C4 operate to hold the transmission in third speed. Accordingly, interlocking of the planetary gear set is prevented.

Also, the fail-safe valve 40 is controlled by the hydraulic pressure supplied to the first, second, third, and fourth friction members C1, C2, C3, and C4, while, at the same time, hydraulic pressure supplied to the operational side chamber h1 of the second friction member C2 is controlled.

For this purpose, the fail-safe valve 40 is comprised of an first port 108 and second port 109, communicating with the control switch valve 38; a third port 110, connected with the second speed line 28 of the shift control valve 26; a fourth port 111, which receives part of the hydraulic pressure supplied to the first friction member C1; a fifth port 112, receiving part of the hydraulic pressure supplied to the release side chamber h2 of the second friction member C2 and to the fourth friction member C4. The second port 109 receives second speed pressure; and a sixth port 114, which supplies the hydraulic pressure supplied from the control switch valve 38 to the operational side chamber h1 of the second friction member C2.

The high-low pressure valve 46 is controlled by receiving control pressure, used for the ON/OFF control of the fifth solenoid valve S5, from the timing control line 52, and after completing shifting into third and fourth speed ranges, third speed pressure is supplied to the pressure regulator valve 8 to change line pressure.

To perform the above, the high-low pressure valve 46 is provided with a first port 115, communicating with the timing control line 52; a second port 116, which receives third speed pressure by communicating with the third speed line 30; and a third port 117, supplying third speed pressure, received as in the above, to the pressure regulator valve 8.

The 2-3/4-3 shift valve 48 is controlled by third and fourth speed pressure supplied in third and fourth speed shift ranges, and is able to selectively supply the hydraulic pressure supplied from the 3-4 shift valve 50 in the reverse R range to the release side chamber h2 of the second friction member C2 and the fourth friction member C4.

Accordingly, the 2-3/4-3 shift valve 48 is realized through a first port 118 connected to the third speed line 30; a second port 119 connected to the fourth speed line 32 through the 3-4 shift valve 50; a third port 120, communicating with the 1-2 shift valve 36 such that it receives hydraulic pressure; a fourth port 121, communicating with the reverse first control line 54; and a fifth port 122, communicating with and receiving hydraulic pressure from the release side chamber h2 of the second friction member C2 and the fourth friction member C4.

The 3-4 shift valve 50 is controlled by the fourth speed pressure of the shift control valve 26. In the first, second, and third speeds, the 3-4 shift valve 50 supplies the hydraulic pressure supplied from the second pressure control valve 20 to the first friction member C1, and in the fourth speed range, fourth speed pressure is supplied to the 2-3/4-3 shift valve 48 to control the same. As a result, the hydraulic pressure supplied to the release side chamber h2 of the second friction member C2 and to the fourth friction member C4 is blocked, and, at the same time, release pressure is controlled.

Accordingly, the 3-4 shift valve 50 is realized through a first port 123 for receiving hydraulic pressure from the fourth speed line 32 and a second port 123A supplying it to the 2-3/4-3 shift valve 48; a third port 124, communicating with the second pressure control valve 20; a fourth port 125 and a fifth port 126 for supplying hydraulic pressure received from the reverse first control line 54 to the 2-3/4-3 shift valve 48; and a sixth port 127, which supplies hydraulic pressure received from the second pressure control valve 20 to the first friction member C1.

The above fourth and fifth ports 125 and 126, which supply hydraulic pressure received from the reverse first control line 54 to the 2-3/4-3 shift valve 48, communicate with a circulation line 64 formed at an end portion of the reverse first control line 54. A check valve 66, which controls the returning hydraulic pressure, is mounted on the circulation line 64 such that release pressure is able to be controlled.

A kick-down switch 68 is fixed to the operational side chamber h1 of the second friction member C2. The kick-down switch 68 turns off when hydraulic pressure is supplied to the operational side chamber h1, and turns on when supplied to the release side chamber h2 of the second friction member C2. This signal of the ON or OFF state of the kickdown switch 68 is transmitted to the TCU.

There is also provided a sixth solenoid valve S6 for controlling the damper clutch control valve 12 by either operating or terminating the operation of the same.

In the hydraulic control system of the present invention structured as in the above and as shown in FIG. 1, the hydraulic pressure discharged from the oil pump 4 in the neutral N range is adjusted to a fixed level of pressure by the pressure regulator valve 8, and after being reduced by passing through the reducing valve 14, it is supplied to the damper clutch control valve 12 and to the first and second pressure control valves 18 and 20.

Here, the third and fourth solenoid valves S3 and S4, duty controlled by the TCU, are controlled to OFF states, and their pressure control valve spools are moved to the right (in the drawing), thereby maintaining the transmission in a neutral state.

Figure 2:
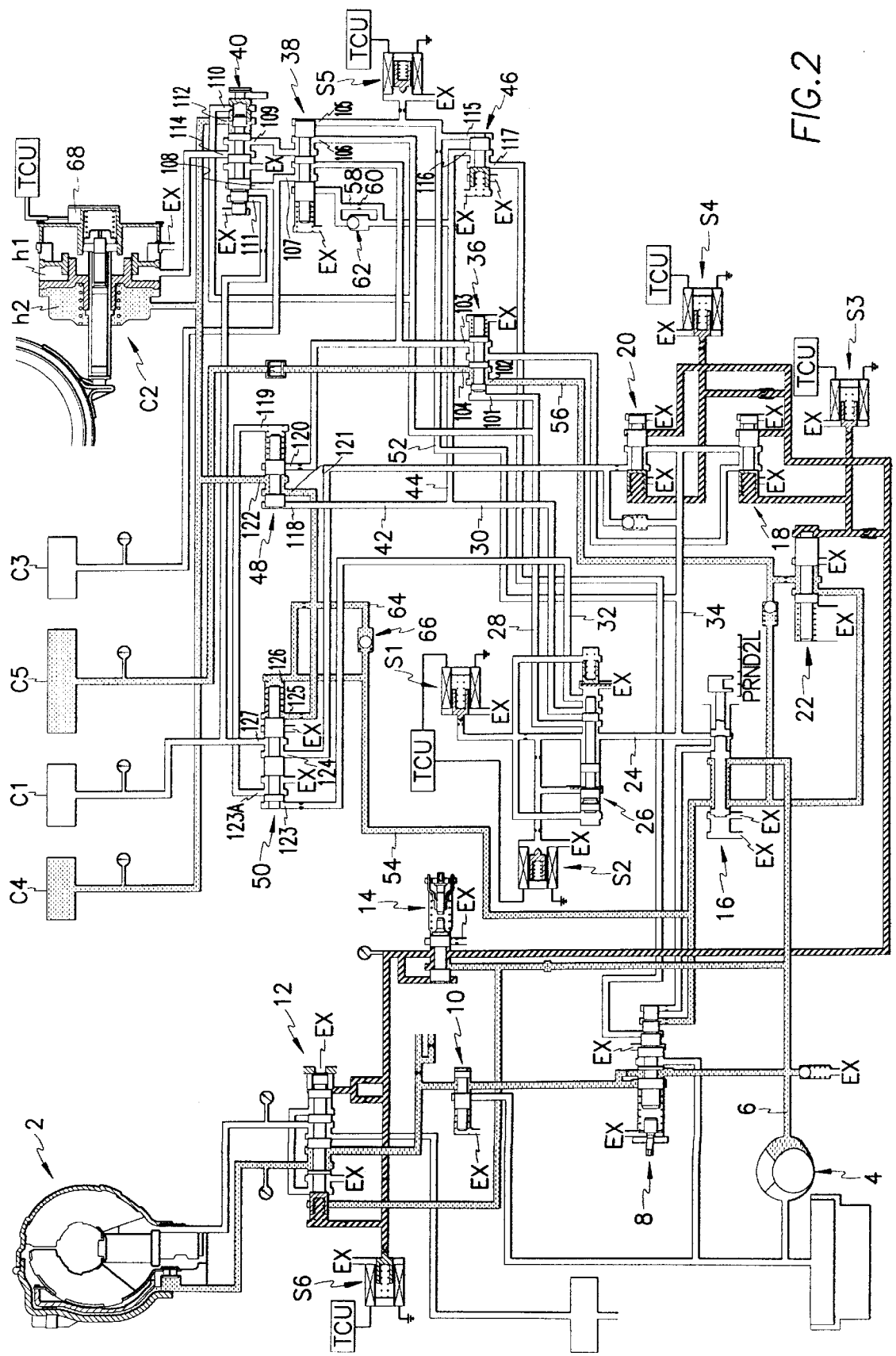
FIG. 2 is a hydraulic circuit diagram illustrating the flow of hydraulic pressure when manually shifting from the neutral N range to a reverse R range in the hydraulic control system according to the first embodiment of the present invention.

Referring to FIG. 2, there is shown the flow of hydraulic pressure when manually shifting from the neutral N range to the reverse R range. Here, the hydraulic pressure from the manual valve 16 is supplied to the release side chamber h2 of the second friction member C2 and to the fourth friction member C4 by passing through the reverse first control line 54, the 3-4 shift valve 50, and the 2-3/4-3 shift valve 48.

Also, part of the hydraulic pressure supplied to the manual valve 16 is controlled in the N-R control valve 22 by the duty control of the third solenoid valve S3 and supplied to the fifth friction member C5 via the reverse second control line 56 and the 1-2 shift valve 36.

After the above, the third solenoid valve S3 is controlled to OFF, and the hydraulic pressure supplied to the fifth friction member C5 is changed from control pressure to drive pressure, completing shifting into the reverse R range.

Figure 3:
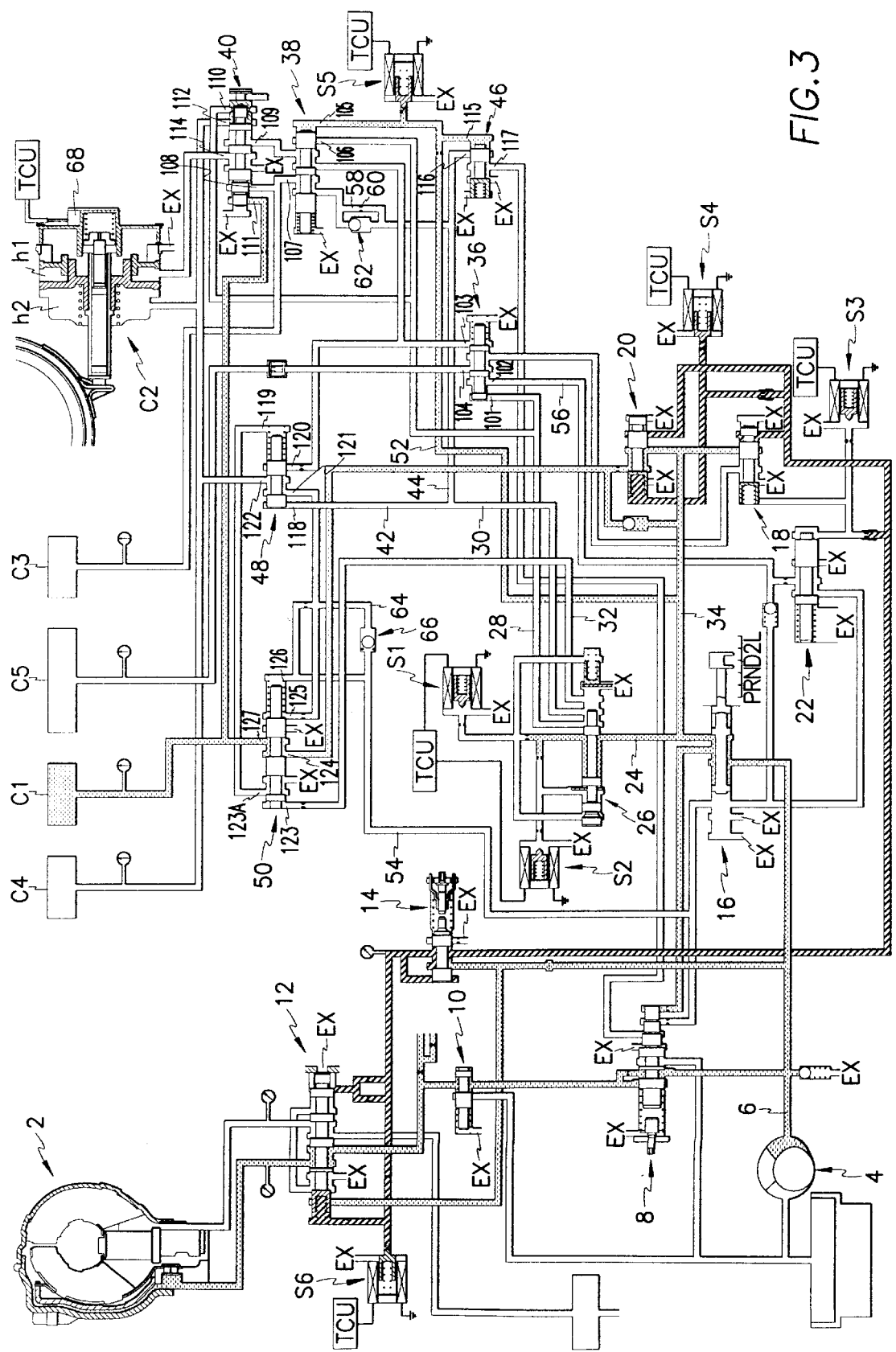
FIG. 3 is a hydraulic circuit diagram illustrating the flow of hydraulic pressure in the first speed of a drive D range in the hydraulic control system according to the first embodiment of the present invention.

Referring to FIG. 3, if the select lever is manually shifted from the neutral N range to the drive D range, part of the hydraulic pressure supplied to the manual valve 16 is supplied to the shift control valve 26 and to the first and second pressure control valves 18 and 20.

At this time, the first and second solenoid valves Si and S2 of the shift control means are controlled to ON states, and the ports of the shift control valve 26 are maintained in their initial states.

In the above state, the hydraulic pressure supplied to the first and second pressure control valves 18 and 20 of the pressure control means is cut off in the first pressure control valve 18 by the ON control of the third solenoid valve S3. Also, the hydraulic pressure supplied to the second pressure control valve 20 is supplied to the first friction member C1, which operates as an input member when in the first speed, via the 3-4 shift valve 50 by the OFF control of the fourth solenoid valve S4.

Figure 4:
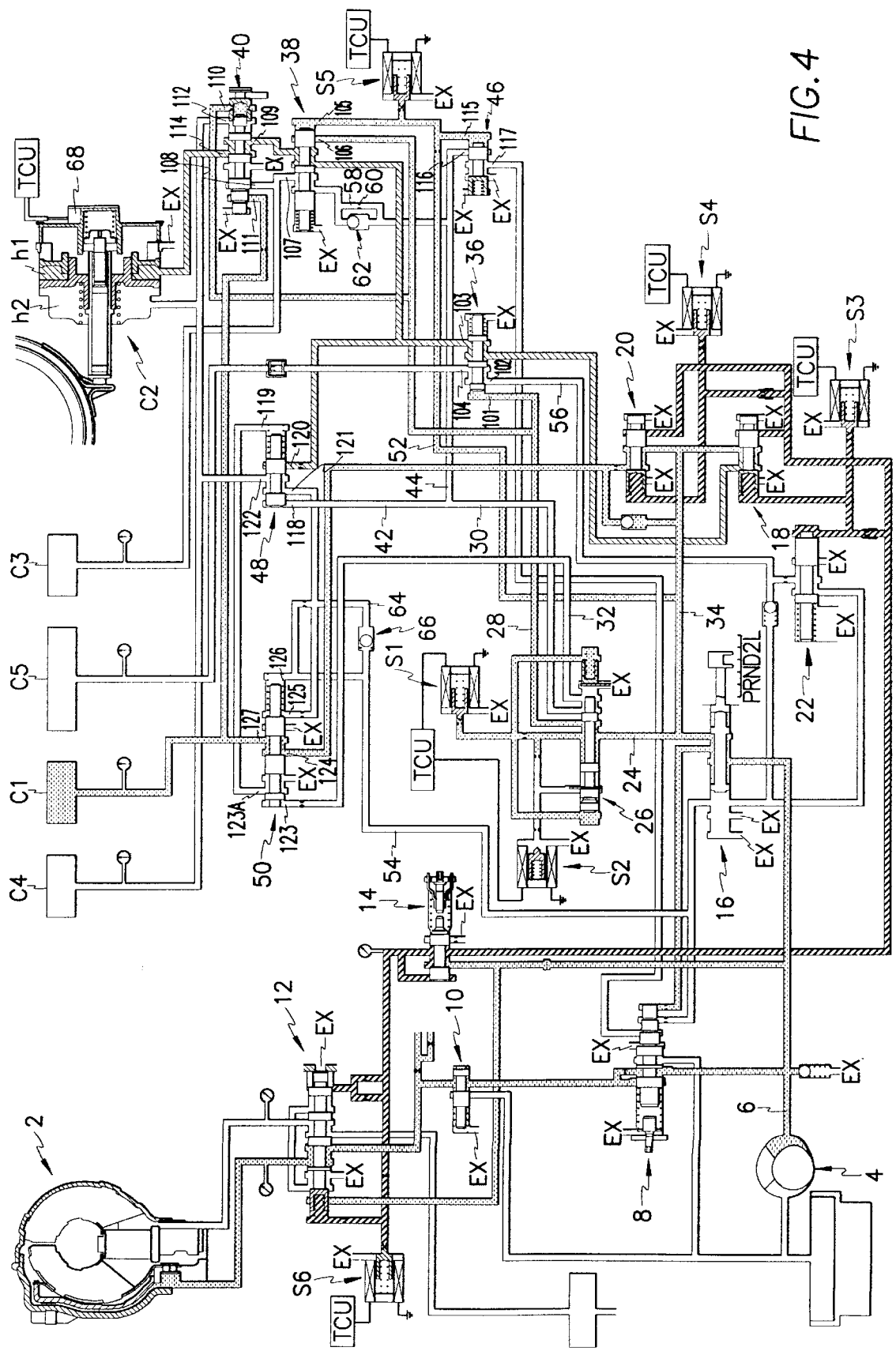
FIG. 4 is a hydraulic circuit diagram illustrating the flow of hydraulic pressure when 1-2 upshifting in the drive D range in the hydraulic control system according to the first embodiment of the present invention.

In this first speed state, if an opening degree of a throttle valve (not shown) is increased for further acceleration, shifting is performed to the second speed. To accomplish this, as shown in FIG. 4, the TCU duty controls the third solenoid valve S3 and, simultaneously, the first solenoid valve S1 to an ON state.

As a result, hydraulic pressure supplied to the operational side chamber h1 of the second friction member C2 is supplied as control pressure by the duty control of the third solenoid valve S3, and the second speed pressure supplied from the shift control valve 26 is supplied to the left-side port of the 1-2 shift valve 36, moving its valve spool to the right (in the drawing), and, at the same time, the pressure is supplied to and remains at the control switch valve 38 and the fail-safe valve 40.

Also, the hydraulic pressure supplied through the timing control line 52 is supplied to the control switch valve 38 and the high-low pressure valve 46 by the OFF control of the fifth solenoid valve S5, moving their valve spools to the left (in the drawing).

Figure 5:
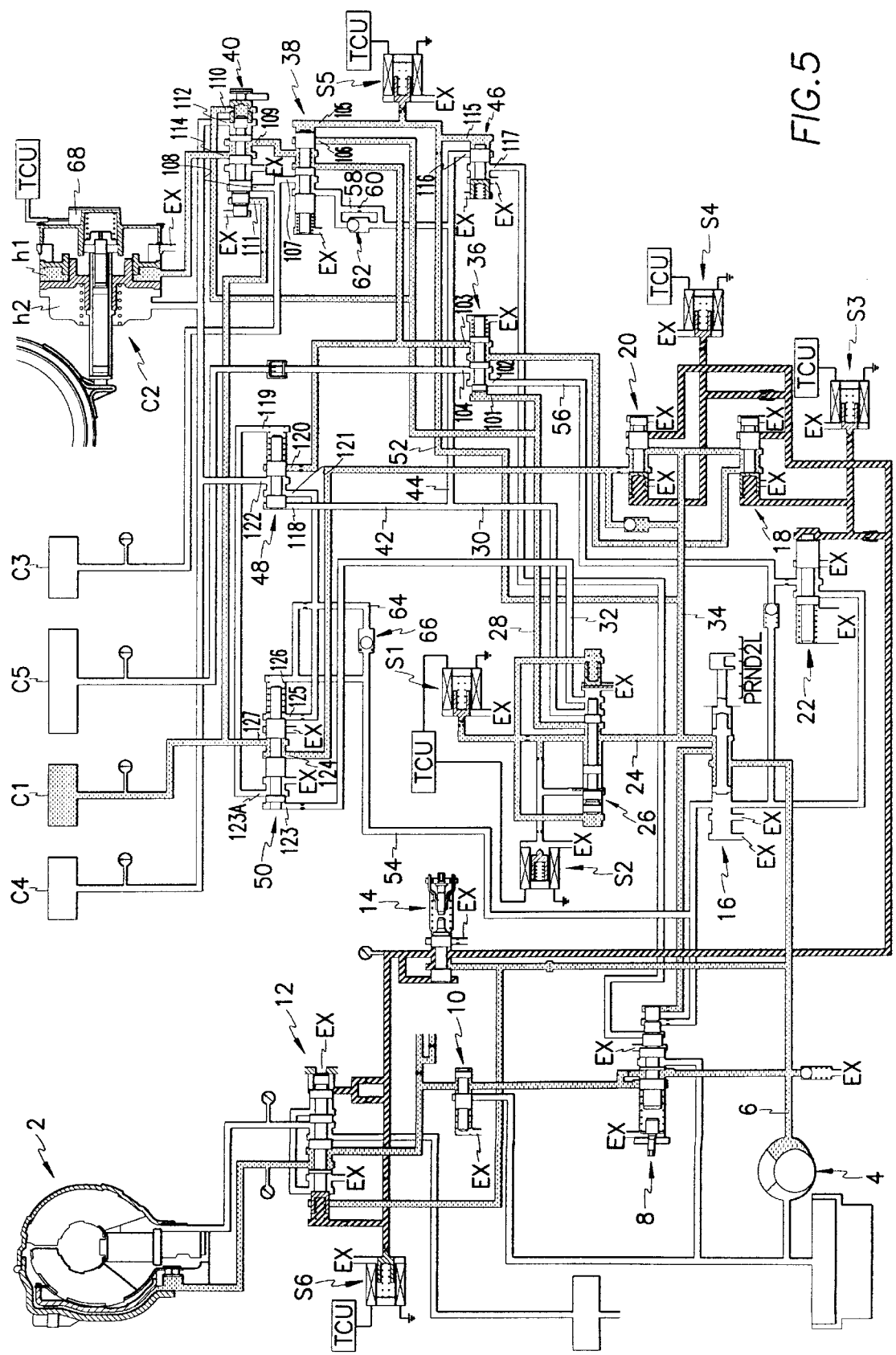
FIG. 5 is a hydraulic circuit diagram illustrating the flow of hydraulic pressure in a second speed of the drive D range in the hydraulic control system according to the first embodiment of the present invention.

In this state where shifting is completed, as is shown in FIG. 5, if the third solenoid valve S3 is controlled to OFF, the pressure supplied to the operational side chamber h1 of the second friction member C2 is converted to second speed line pressure from control pressure, completing shifting into the second speed.

Figure 6:
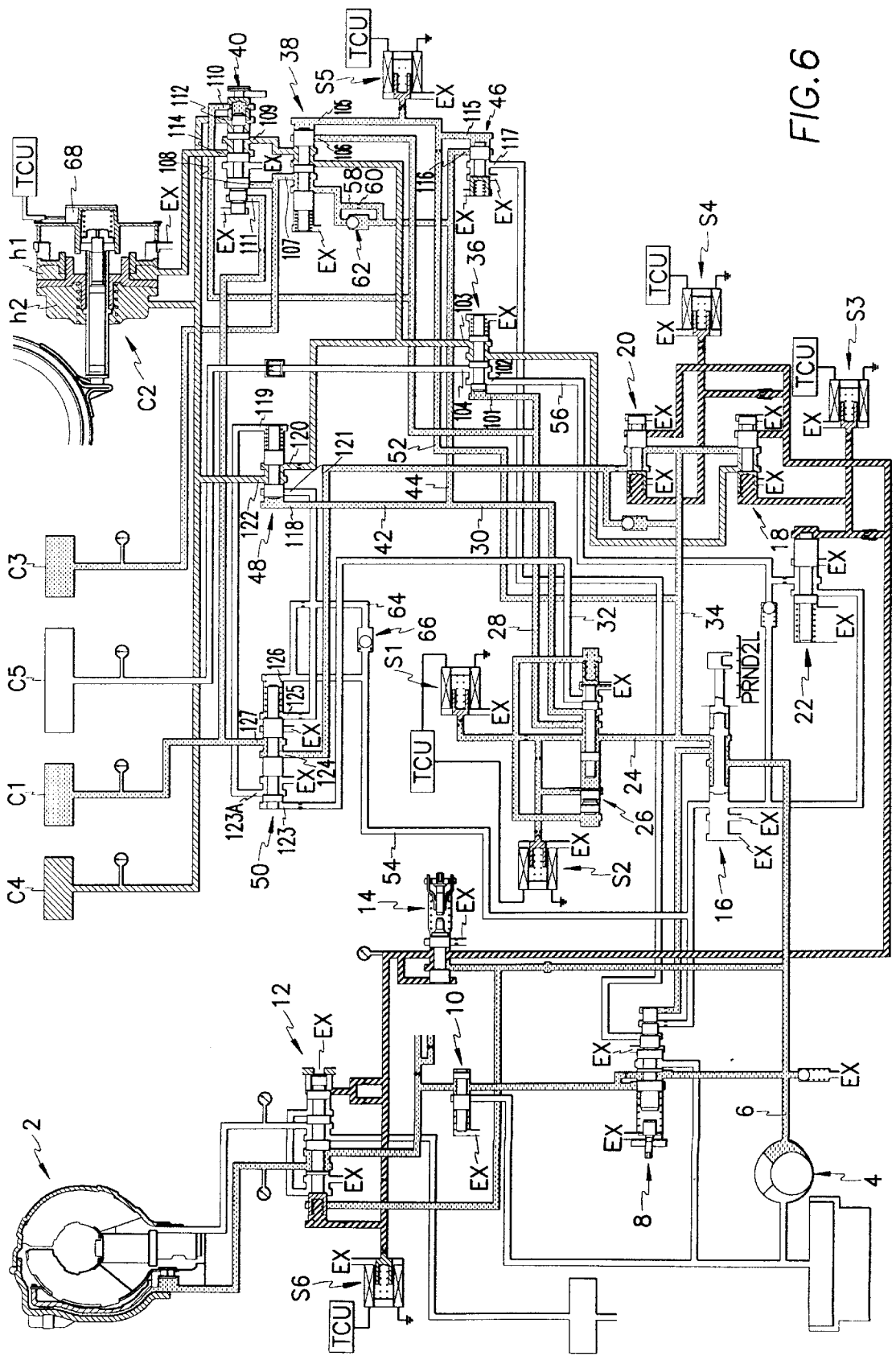
FIG. 6 is a hydraulic circuit diagram illustrating the flow of hydraulic pressure when 2-3 upshifting in the drive D range in the hydraulic control system according to the first embodiment of the present invention.

As shown in FIG. 6, in the state of second speed control as in the above, if the throttle valve is further opened, the first and second solenoid valves S1 and S2 of the shift control means are controlled to OFF states, and the third solenoid valve S3 is duty controlled.

Through the above control, hydraulic pressure supplied to the operational side chamber h1 of the second friction member C2 is supplied as control pressure by the duty control of the third solenoid valve S3, and hydraulic pressure comes to flow through the second speed line 28 and the third speed line 30 in the shift control valve 26. The hydraulic pressure of the third speed line 30 then flows into the left side port of the 2-3/4-3 shift valve 48, moving its valve spool to the right (in the drawing), and comes to be supplied to the control switch valve 38 and the high-low pressure valve 46.

As a result of the above, when controlling second speed, the hydraulic pressure standing by in the 2-3/4-3 shift valve 48 is supplied to the release side chamber h2 of the second friction member C2 and to the fourth friction member C4, stopping the operation of the second friction member C2, and activating the fourth friction member C4.

Also, as the valve spool of the control switch valve 38 is maintained in a leftward position (in the drawing) by the OFF control of the fifth solenoid valve S5, the third speed pressure supplied to the control switch valve 38 is supplied to the third friction member C3.

In the above, the third friction member C3 is operated after the operation of the second and fourth friction members C2 and C4.

Figure 7:
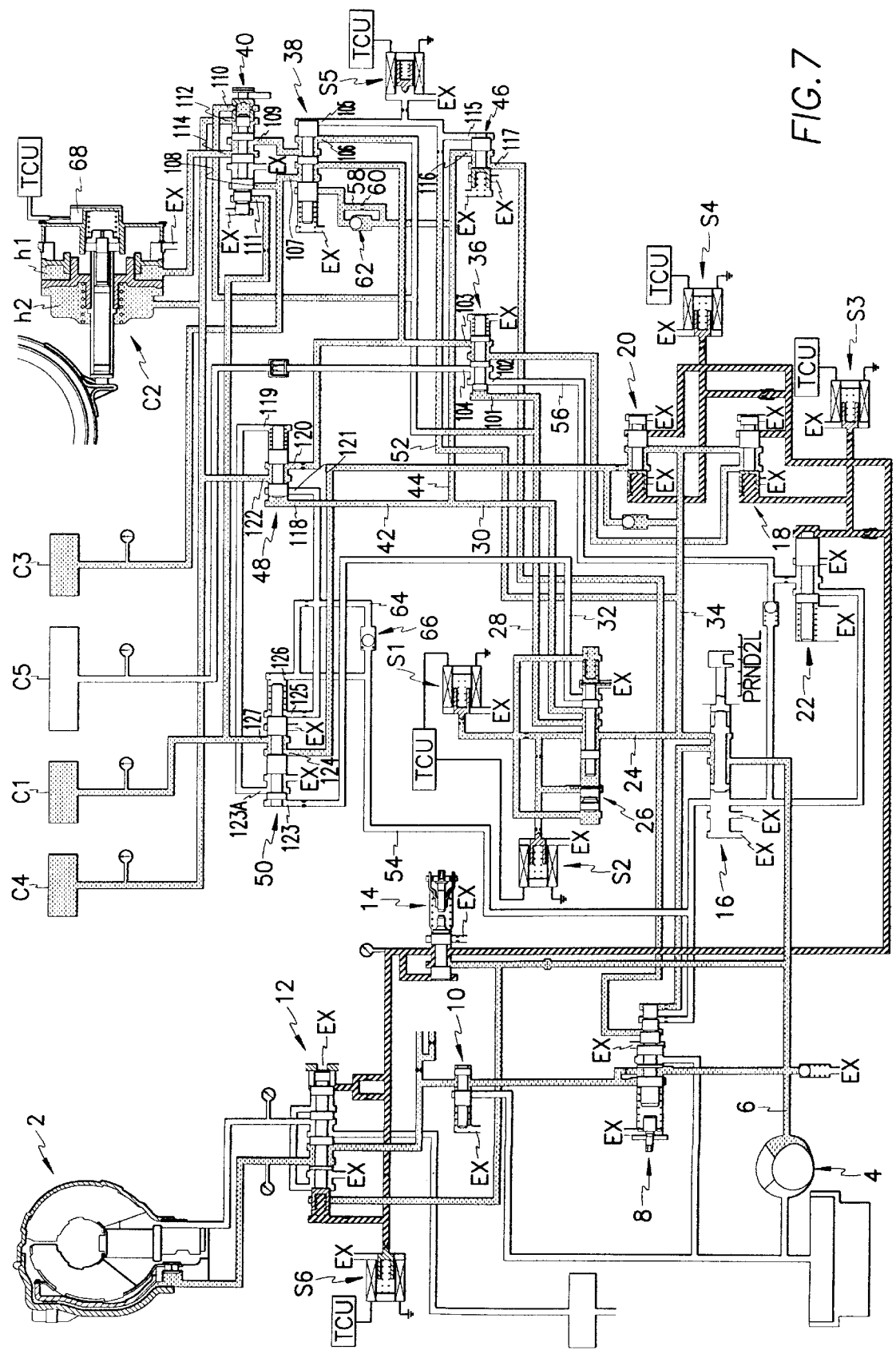
FIG. 7 is a hydraulic circuit diagram illustrating the flow of hydraulic pressure in a third speed of the drive D range in the hydraulic control system according to the first embodiment of the present invention.

In this state, as shown in FIG. 7, if the fifth solenoid valve S5, controlled to an OFF state, is controlled to an ON state at an end period of shifting, valve spools of the control switch valve 38 and the high-low pressure valve 46 are moved rightward (in the drawing). As a result, the pressure supplied to the operational side chamber h1 of the second friction member C2 is converted into second speed pressure and, at the same time, the hydraulic pressure supplied to the third friction member C3 is converted and supplied as first speed pressure via the first pressure control valve 18, thereby completing shifting.

Line pressure is adjusted after passing through the high-low pressure valve 46 and after being supplied to the pressure regulator valve 8. That is, the change of line pressure in the third speed is not realized during shifting from the second speed to the third speed but, rather, it begins its change when the valve spool of the high-low pressure valve 46 moves to the right (in the drawing) after the fifth solenoid valve S5 is controlled to ON.

Also, the regulation of line pressure as in the above is done for the purpose of reducing possible drive damage to the oil pump 4 and to improve fuel efficiency when travelling at high speeds.

Figure 8:
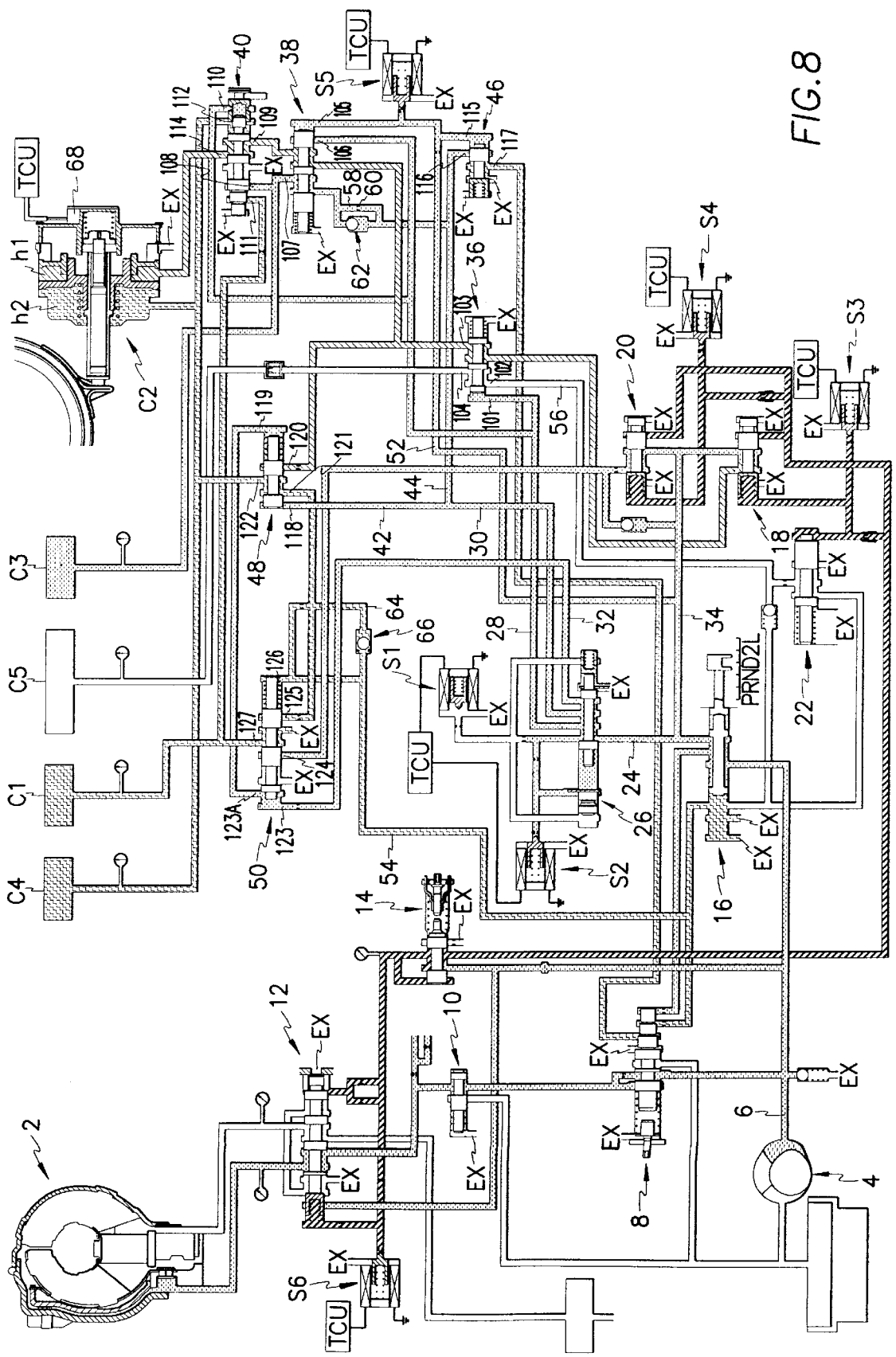
FIG. 8 is a hydraulic circuit diagram illustrating the flow of hydraulic pressure when 3-4 upshifting in the drive D range in the hydraulic control system according to the first embodiment of the present invention.

In the above third speed control state, if the throttle valve is further opened, the TCU, as shown in FIG. 8, controls the first solenoid valve S1 to an ON state, the second solenoid valve S2 to an OFF state, duty controls the third solenoid valve S3, and controls the fifth solenoid valve S5 to an OFF state.

As a result, hydraulic pressure supplied to the operational side chamber h1 of the second friction member C2 is supplied as control pressure by the duty control of the third solenoid valve S3 such that hydraulic pressure flows through the second, third, and fourth speed lines 28, 30, and 32.

Accordingly, the hydraulic pressure of the fourth speed line 32 controls the 3-4 shift valve 50 and the 2-3/4-3 shift valve 48, moving their valve spools respectively to the right and left (in the drawing).

When this happens, the operational pressure supplied to the first friction member C1 is quickly exhausted through a discharge port EX of the 3-4 shift valve 50 and, at the same time, the operational pressure supplied to the fourth friction member C4 and the release side chamber h2 of the second friction member C2 is exhausted through the manual valve 16 via the 2-3/4-3 shift valve 48, the 3-4 shift valve 50, and the reverse first control line 54.

Here, the release pressure exhausted through the release side chamber h2 of the second friction member C2 is controlled by the duty control pressure supplied to its operational side chamber h1.

Also, the hydraulic pressure varying the line pressure is released through the exhaust port EX of the high-low pressure valve 46 by the OFF control of the fifth friction member S5, temporarily discontinuing control line pressure.

Figure 9:
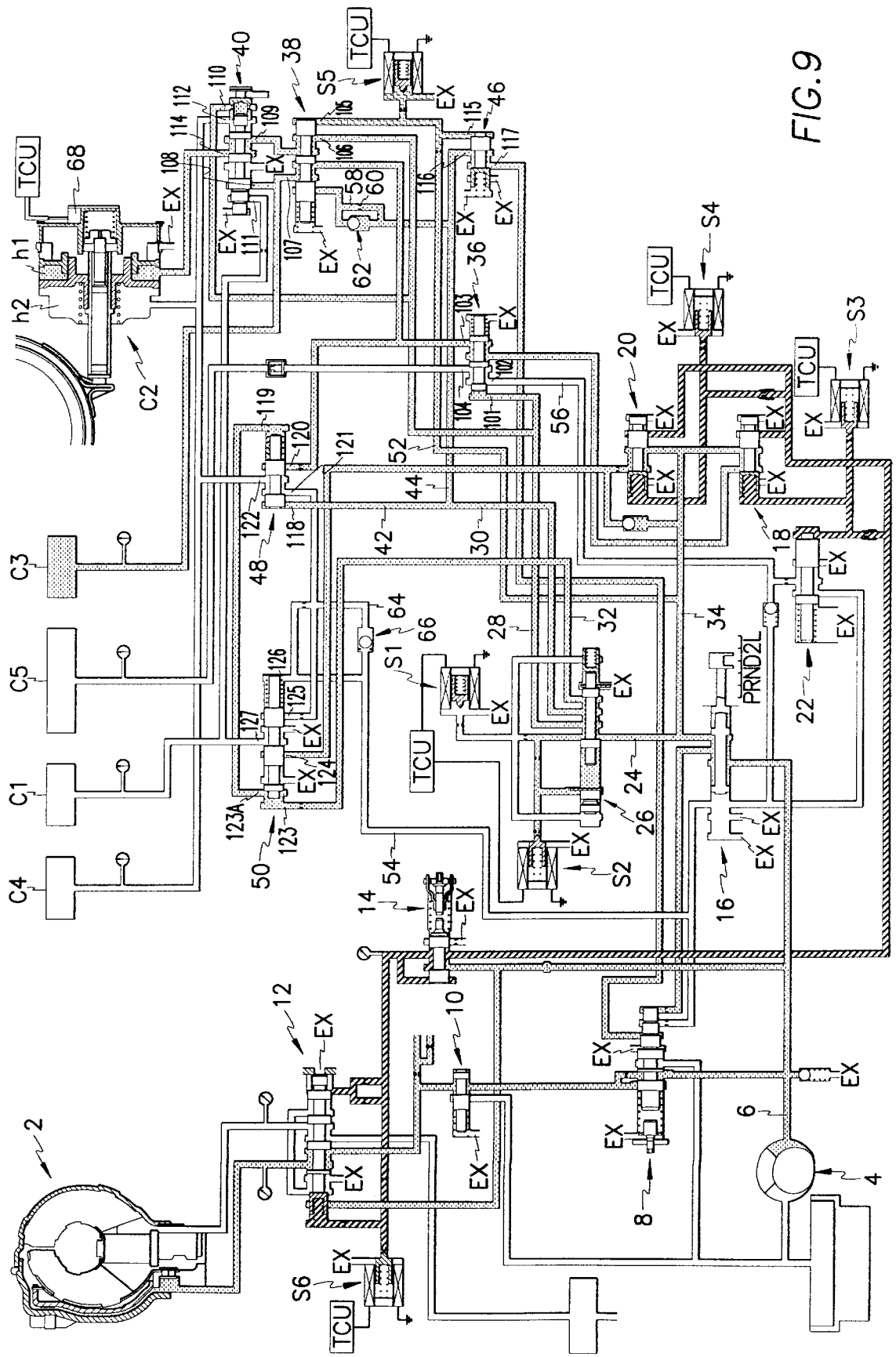
FIG. 9 is a hydraulic circuit diagram illustrating the flow of hydraulic pressure in a fourth speed of the drive D range in the hydraulic control system according to the first embodiment of the present invention.

Referring to FIG. 9, after control has been realized in the above, the fifth solenoid valve S5 is controlled to an ON state to move the valve spool of the control switch valve 38 to the right (in the drawing), allowing second speed pressure to be supplied to the operational side chamber h1 of the second friction member C2, and third speed pressure to be supplied to the pressure regulator valve 8 via the high-low pressure valve 46, realizing the completion of shifting into the fourth speed.

Figure 10:
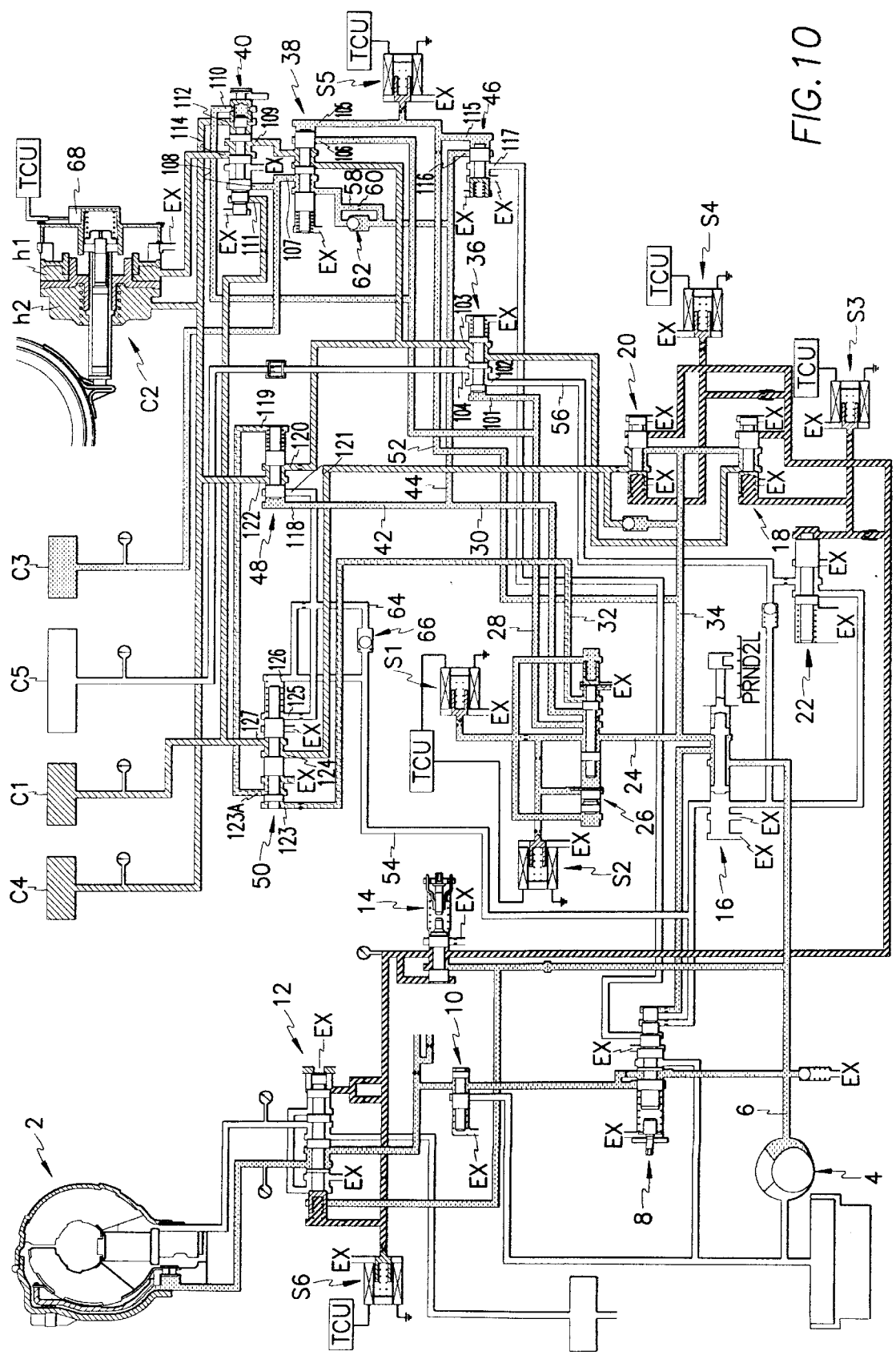
FIG. 10 is a hydraulic circuit diagram illustrating the flow of hydraulic pressure when 4-3 downshifting in the drive D range in the hydraulic control system according to the first embodiment of the present invention.

Referring now to FIG. 10, when down shifting from the fourth speed to the third speed, the first solenoid valve S1, controlled to ON in the fourth speed, is controlled to an OFF state, and the hydraulic pressure supplied to the fourth speed line 32 is exhausted through the shift control valve 26, resulting in the valve spool of the 3-4 shift valve 50 being moved to the left (in the drawing).

Also, by the OFF control of the fifth solenoid valve S5, the operational pressure, supplied to the operational side chamber h1 of the second friction member C2, is converted to control pressure for duty controlling the third solenoid valve S3, and part of this control pressure is supplied to the release side chamber h2 of the second friction member C2 and to the fourth friction member C4 via the 2-3/4-3 shift valve 48.

Further, the control pressure of the first pressure control valve 18, duty controlled by the fourth solenoid valve S4, is supplied to the first friction member C1 through the 3-4 shift valve 50.

That is, when shifting from the fourth speed to the third speed as in the above, because the operational pressure of the first friction member C1 is supplied by the duty control of the fourth solenoid valve S4, shift shock does not develop, and in the shifting process, the problem of temporarily moving into the neutral N range is prevented.

Figure 11:
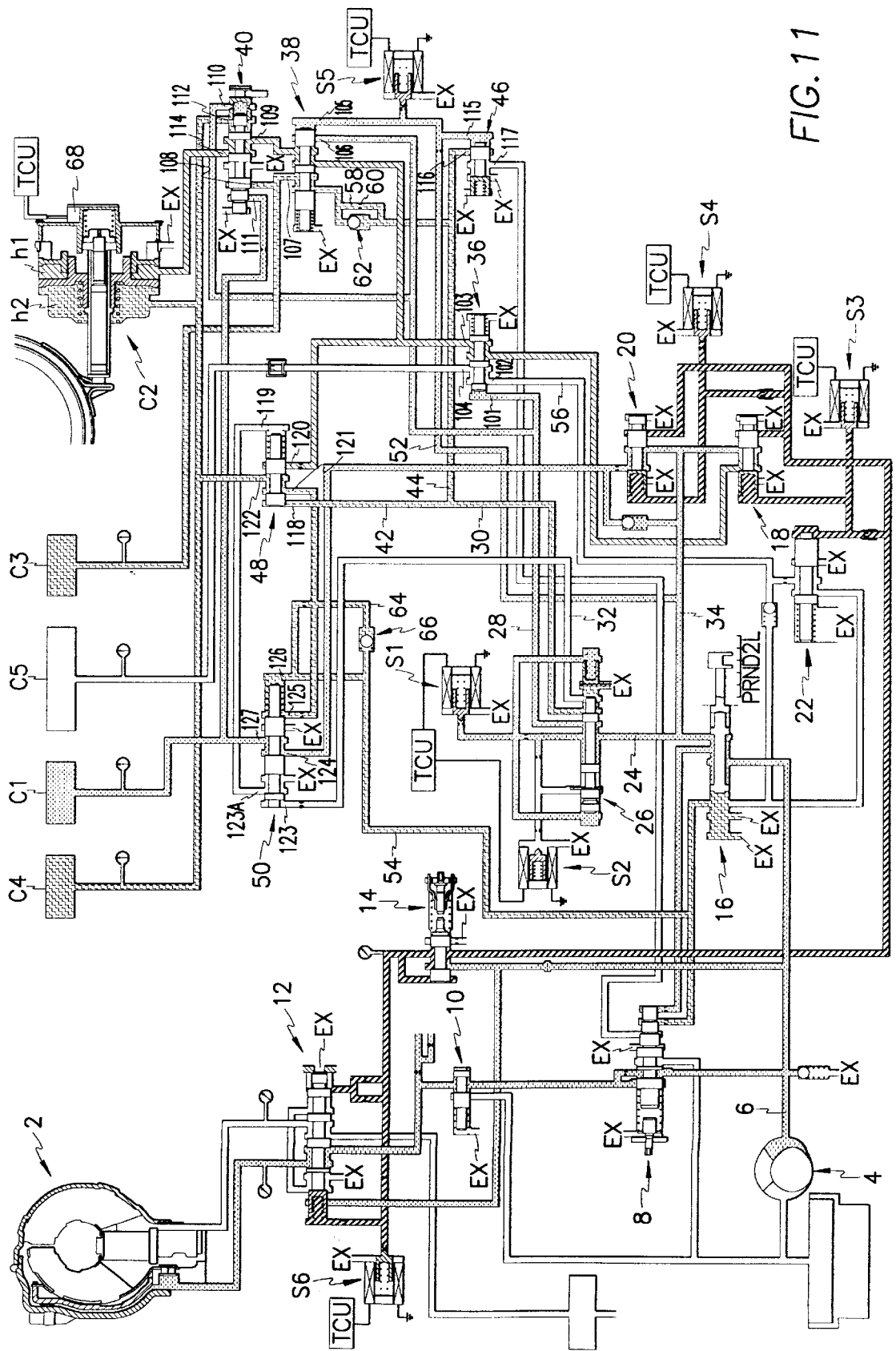
FIG. 11 is a hydraulic circuit diagram illustrating the flow of hydraulic pressure when 3-2 downshifting in the drive D range in the hydraulic control system according to the first embodiment of the present invention.

Referring to FIG. 11, when 3-2 downshifting, the second solenoid valve S2, controlled to OFF in the third speed, is controlled to an ON state, quickly exhausting the hydraulic pressure supplied to the third friction member C3 via the third speed line 30 and the shift control valve 26.

Thus, the valve spool of the 2-3/4-3 shift control valve 48 moves leftward (in the drawing), and the hydraulic pressure supplied to the release side chamber h2 of the second friction member C2 and to the fourth friction member C4 passes through the 2-3/4-3 shift valve 48, the 3-4 shift valve 50, and the reverse first control line 54 to be discharged through the manual valve 16.

Further, after the hydraulic pressure supplied to the operational side chamber h1 of the second friction member C2 is changed to complete shifting by the duty control of the third solenoid valve S3 and the OFF control of the fifth solenoid valve S5, it is then changed to and supplied as first speed pressure by the OFF control of the third solenoid valve S3, completing the shift operation and resulting in a hydraulic flow state as shown in FIG. 5.

Figure 12:
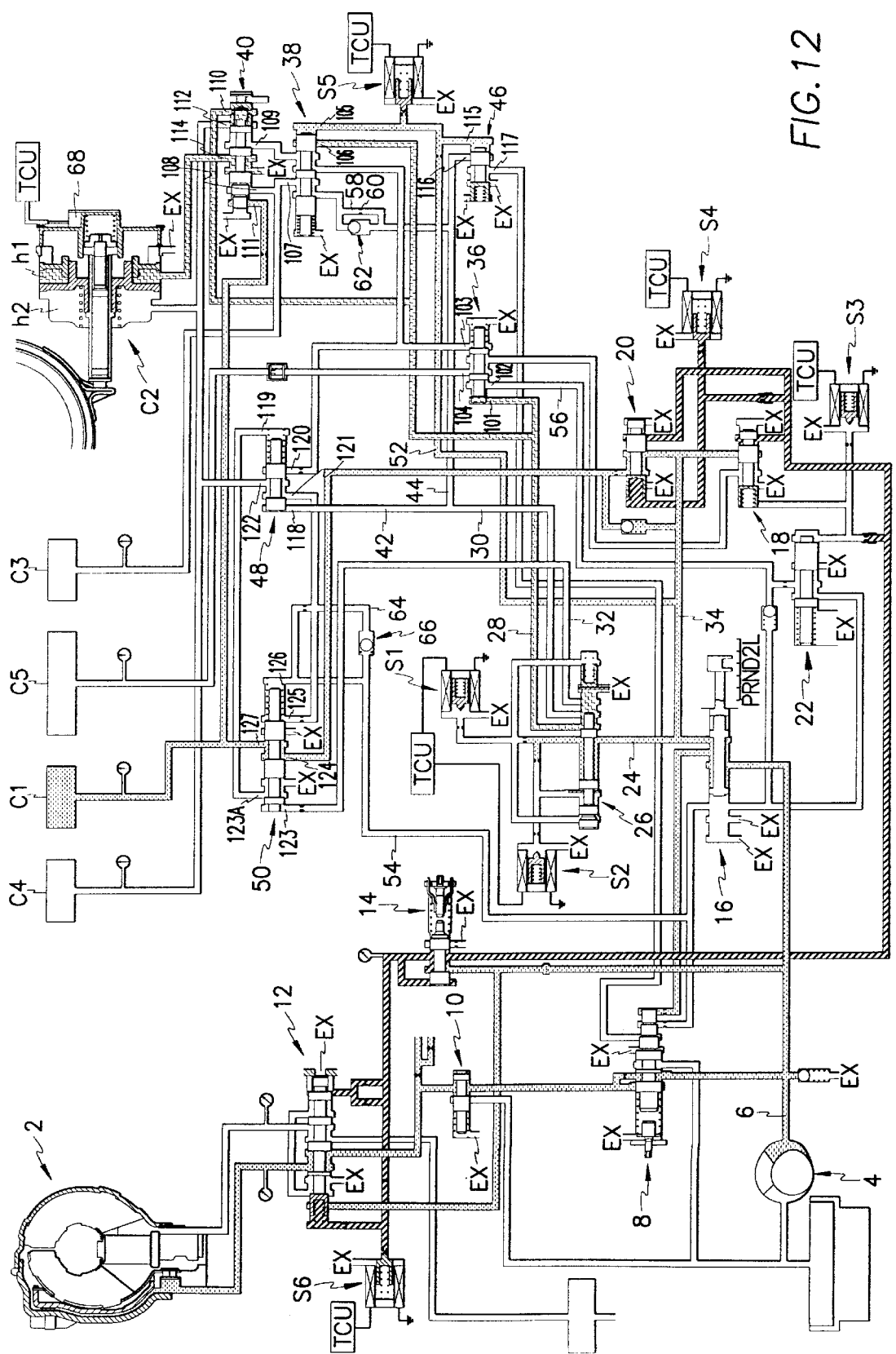
FIG. 12 is a hydraulic circuit diagram illustrating the flow of hydraulic pressure when 2-1 downshifting in the drive D range in the hydraulic control system according to the first embodiment of the present invention.

Referring to FIG. 12, when 2-1 downshifting, the first solenoid valve Si is maintained in an OFF state until the end period of shifting where it is controlled to an ON state, the second solenoid valve S2 is controlled to an ON state, and the third and fifth solenoid valves S3 and S5 are maintained in OFF states.

As a result of the above, the hydraulic pressure supplied to the second speed line 28 is quickly discharged through a discharge port EX of the shift control valve 26, and the hydraulic pressure supplied to the operational side chamber h1 of the second friction member C2 is exhausted through the fail-safe valve 40, realizing 2-1 shifting.

Figure 13:
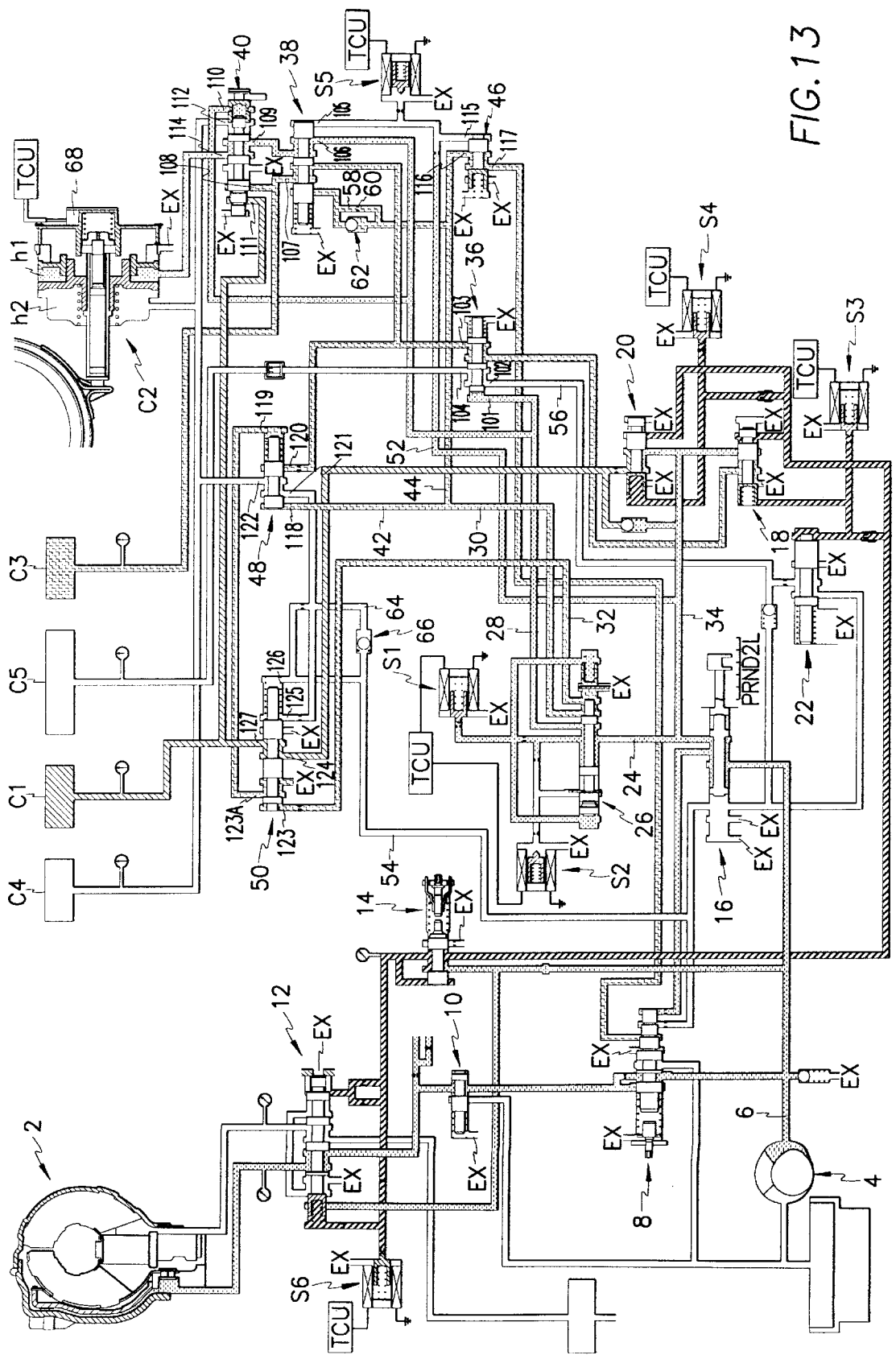
FIG. 13 is a hydraulic circuit diagram illustrating the flow of hydraulic pressure when 4-2 downshifting in the drive D range in the hydraulic control system according to the first embodiment of the present invention.

Referring to FIG. 13, when 4-2 downshifting, in the fourth speed state, the third and fourth solenoid valves S3 and S4 are duty controlled, and the fifth solenoid valve S5 is controlled to ON.

When this is done, the hydraulic pressure supplied to the third and fourth speed lines 30 and 32 is discharged through the discharge port EX of the shift control valve 26, and the valve spools of the 3-4 shift valve 50 and the 2-3/4-3 shift valve 48 are moved to the left (in the drawing).

Also, by the duty control of the third solenoid valve S3, the hydraulic pressure supplied to the third friction member C3 is discharged through a discharge port EX of the first pressure control valve 18, and the control pressure controlled by the second pressure control valve 20, is supplied to the first friction member C1 via the 3-4 shift valve 50 to realize shifting.

Namely, when 4-2 downshifting as in the above, the pressure of the operational side chamber h1 of the second friction member C2 acts as second speed pressure, the operational pressure of the first friction member C3 and the pressure of the third pressure control valve 18 are combined and exhausted, and, as the first friction member C1 is controlled independently, clutch to clutch control is possible.

Figure 14:
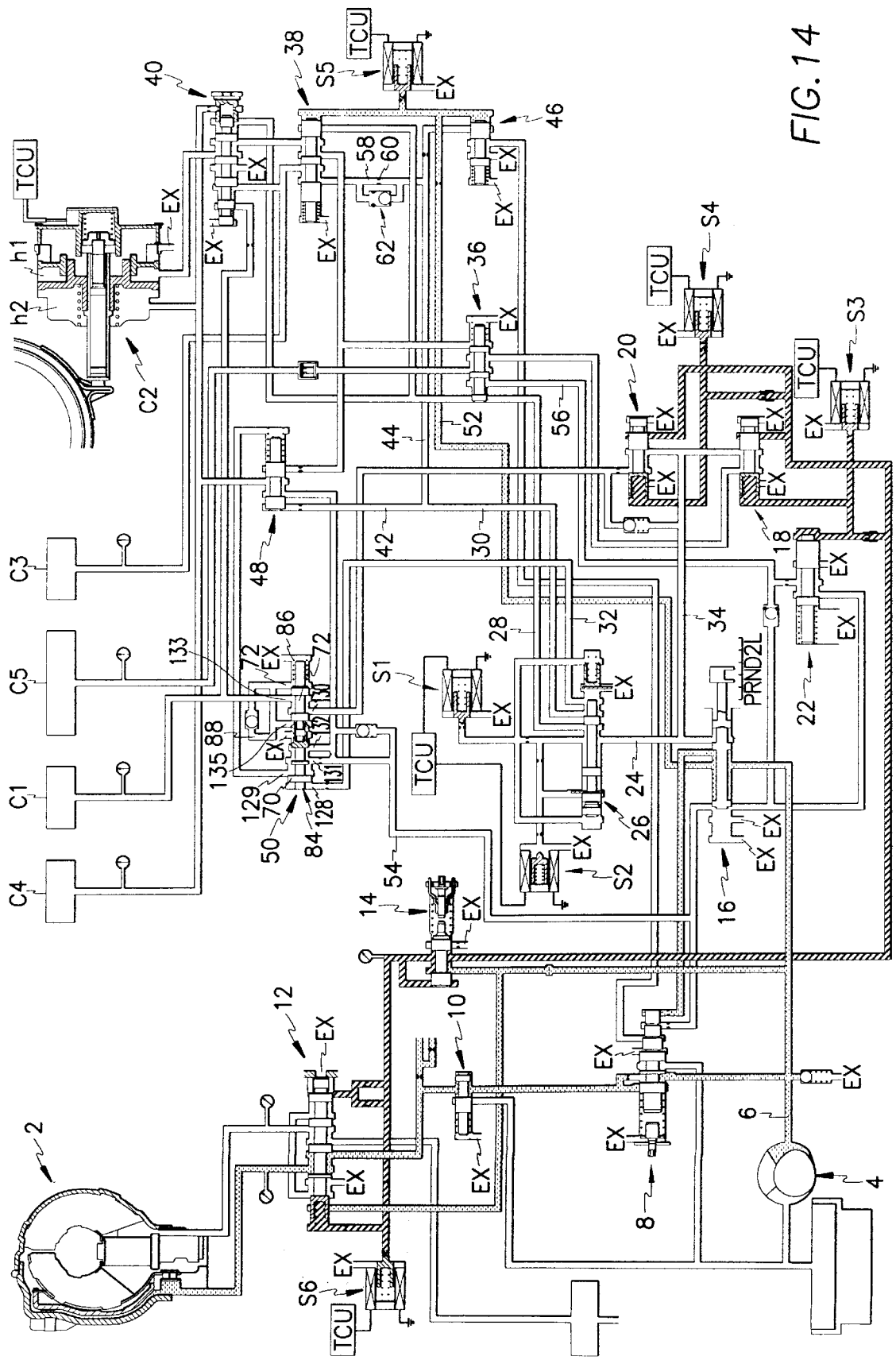
FIG. 14 is a hydraulic circuit diagram illustrating the flow of hydraulic pressure in a neutral N range in a hydraulic control system according to a second embodiment of the present invention.

Referring now to FIG. 14, there is illustrated the flow of hydraulic pressure in a neutral N range in a hydraulic control system according to a second embodiment of the present invention. Here, the 3-4 shift valve 50 is controlled by fourth speed pressure and by the control pressure of the second pressure control valve 20, and has a valve spool 84 elastically supported by an elastic member 86.

Namely, the 3-4 shift valve 50 is controlled by the fourth speed pressure of the shift control valve 26, and in the first, second, and third speeds, the hydraulic pressure supplied from the second pressure control valve 20 is able to be supplied to the first friction member C1. Also, when 3-4 shifting, the hydraulic pressure supplied to the first friction member C1 is directly exhausted, and when 3-4 and 3-2 shifting, the hydraulic pressure supplied to the release side chamber h2 of the second friction member C2 and the fourth friction member C4 is exhausted through the manual valve 16 after passing through the 2-3/4-3 shift valve 48 and the reverse first control line 54.

To realize the above, the 3-4 shift valve 50 is comprised of a first port 128 and a second port 129, for supplying hydraulic pressure received from the fourth speed line 32 to the 2-3/4-3 shift valve 48; a third port 130, communicating with the second pressure control valve 20; a fourth port 131 and a fifth port 132, communicating with the reverse first control line 54 and, simultaneously, communicating with the 2-3/4-3 shift valve 48; a sixth port 133, for supplying hydraulic pressure supplied from the second pressure control valve 20 to the first friction member C1; and a seventh port 134 and a eighth port 135 ports of a circulation line 88 which circulates the hydraulic pressure supplied to the sixth port 133 receiving hydraulic pressure from the first friction member C1.

Also, the valve spool 64 mounted in the 3-4 shift valve 50 is realized through a first spool 70 and a second spool 72. The first spool 70 is controlled by fourth speed pressure, and the second spool 72 is controlled by the control pressure of the second pressure control valve 20. The elastic member 66 elastically supports the second spool 72.

Figure 15:
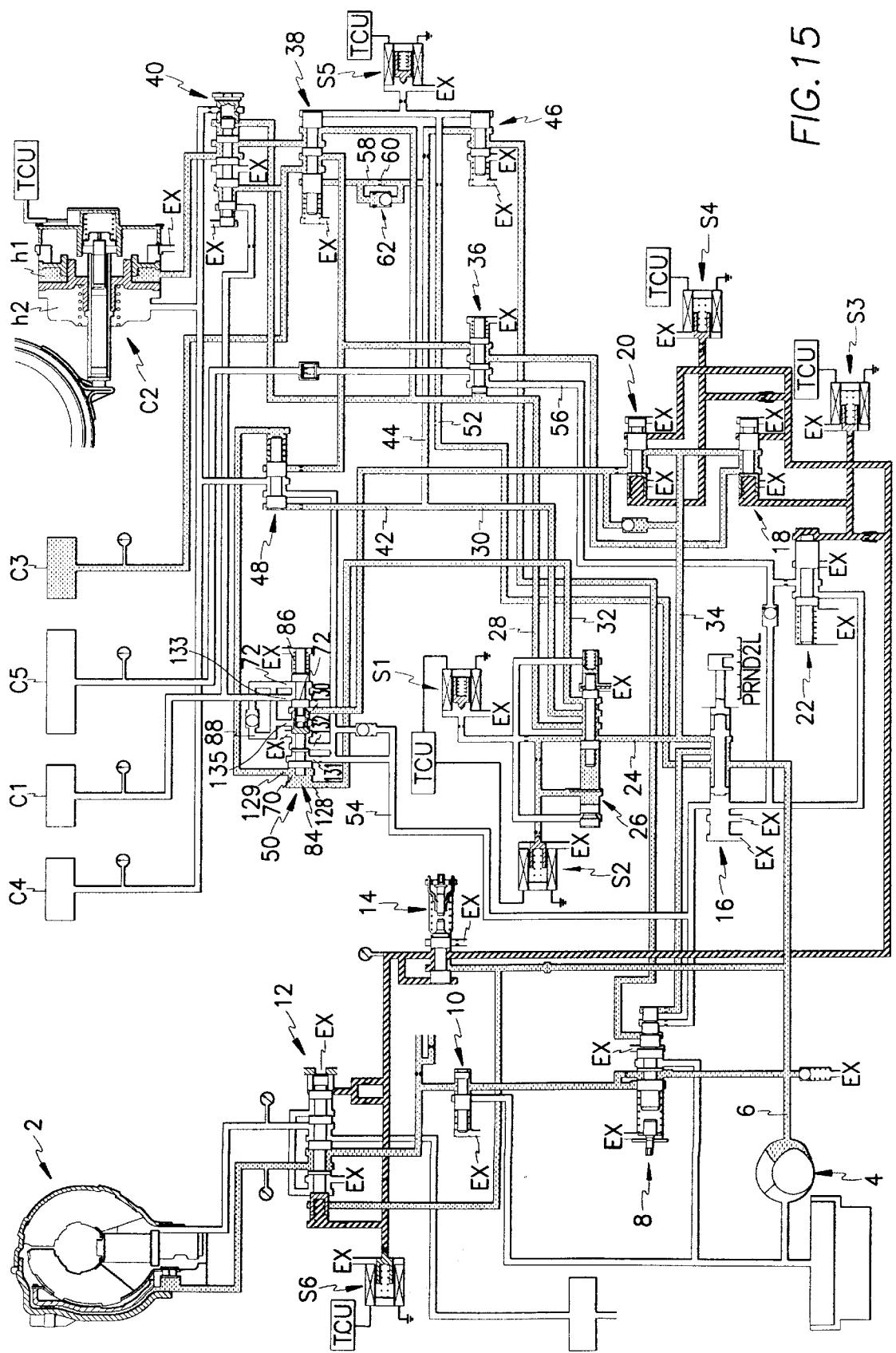
FIG. 15 is a hydraulic circuit diagram illustrating the flow of hydraulic pressure in a fourth speed of a drive D range in the hydraulic control system according to the second embodiment of the present invention.

Referring to FIG. 15, in the second embodiment of the present invention applying the 3-4 shift valve 50 structured as in the above, the TCU controls the first solenoid valve S1 to an ON state, and the second solenoid valve S2 to an OFF state such that hydraulic pressure flows to the second, third, and fourth speed lines 28, 30, and 32, and by the control of the fourth solenoid valve S4 to an OFF state, hydraulic pressure is supplied to the second and third friction members C2 and C3, realizing shifting into the fourth speed.

In the above fourth speed state, hydraulic pressure is supplied to the pressure regulator valve 8 through the high-low pressure valve 46 to realize a change in line pressure.

Figure 16:
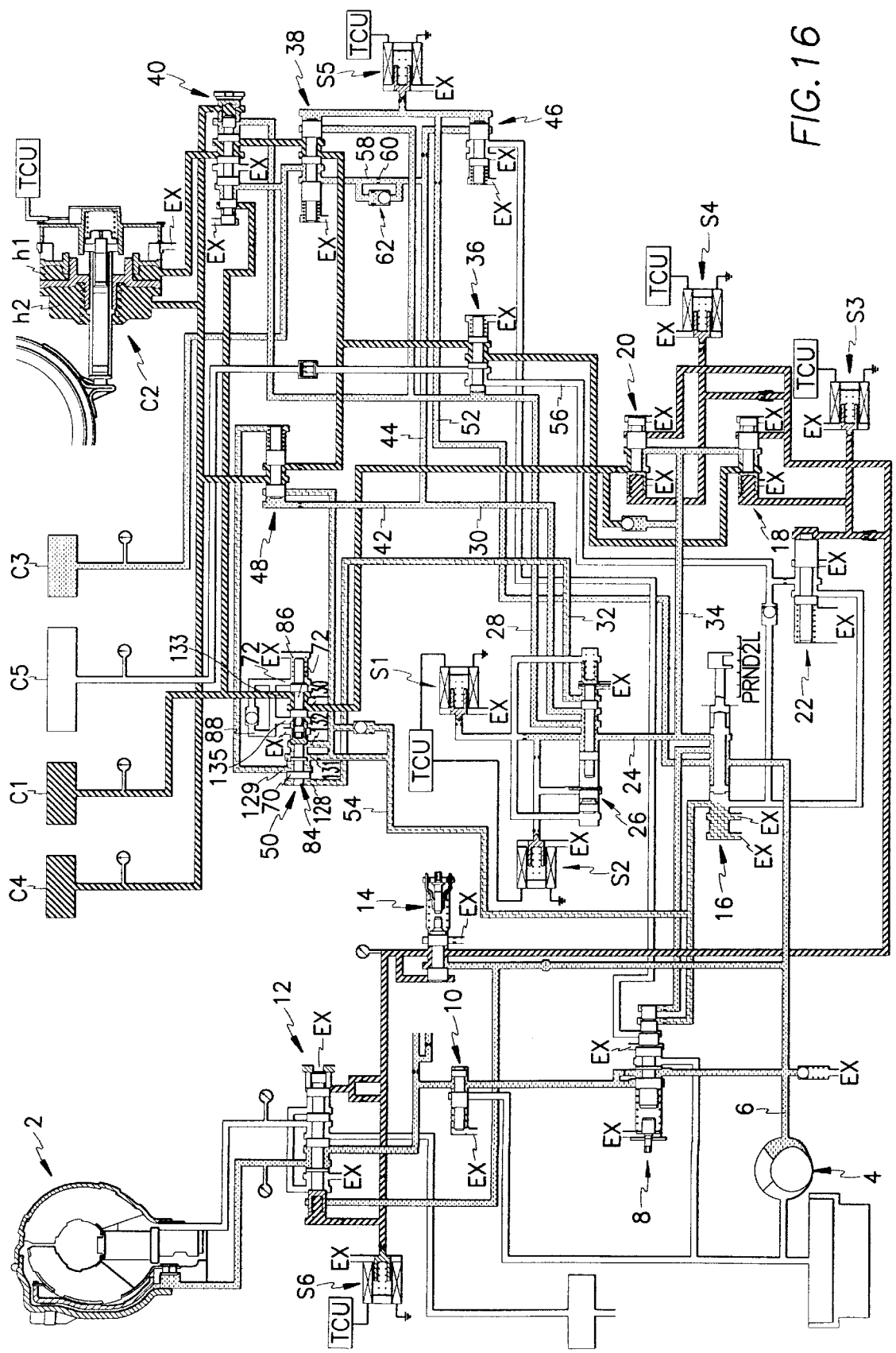
FIG. 16 is a hydraulic circuit diagram illustrating the flow of hydraulic pressure when 4-3 downshifting in the drive D range in the hydraulic control system according to the second embodiment of the present invention.

Referring to FIG. 16, when 4-3 downshifting, the first solenoid valve S1, controlled to ON in the fourth speed, is controlled to OFF, and the hydraulic pressure supplied to the fourth speed line 32 is exhausted through the shift control valve 26. Consequently, the valve spools of the 3-4 shift valve 50 and the 2-3/4-3 shift valve 48 move to the left.

Here, the valve spool 64 of the 3-4 shift valve 50 is moved to the left by the elastic member 66 and the control pressure of the second pressure control valve 20, and control pressure is supplied to the first friction member C1.

Further, by the duty control of the third and fourth solenoid valves S3 and S4, part of the hydraulic pressure, controlled in the first pressure control valve 18 and supplied to the control switch valve 38 through the 1-2 shift valve 36, is supplied to the operational side chamber h1 of the second friction member C2 by the OFF control of the fifth solenoid valve S5, and the rest of the hydraulic pressure is supplied to the fourth friction member C4 and the release side chamber h2 of the second friction member C2 through the 2-3/4-3 shift valve 48.

Concurrent with the above, the hydraulic pressure controlled by the second friction member C2 is supplied to the first friction member C1 via the 3-4 shift valve 50, and after shifting is completed, normal line pressure is supplied by the OFF control of the third and fourth solenoid valves S3 and S4.

Figure 17:
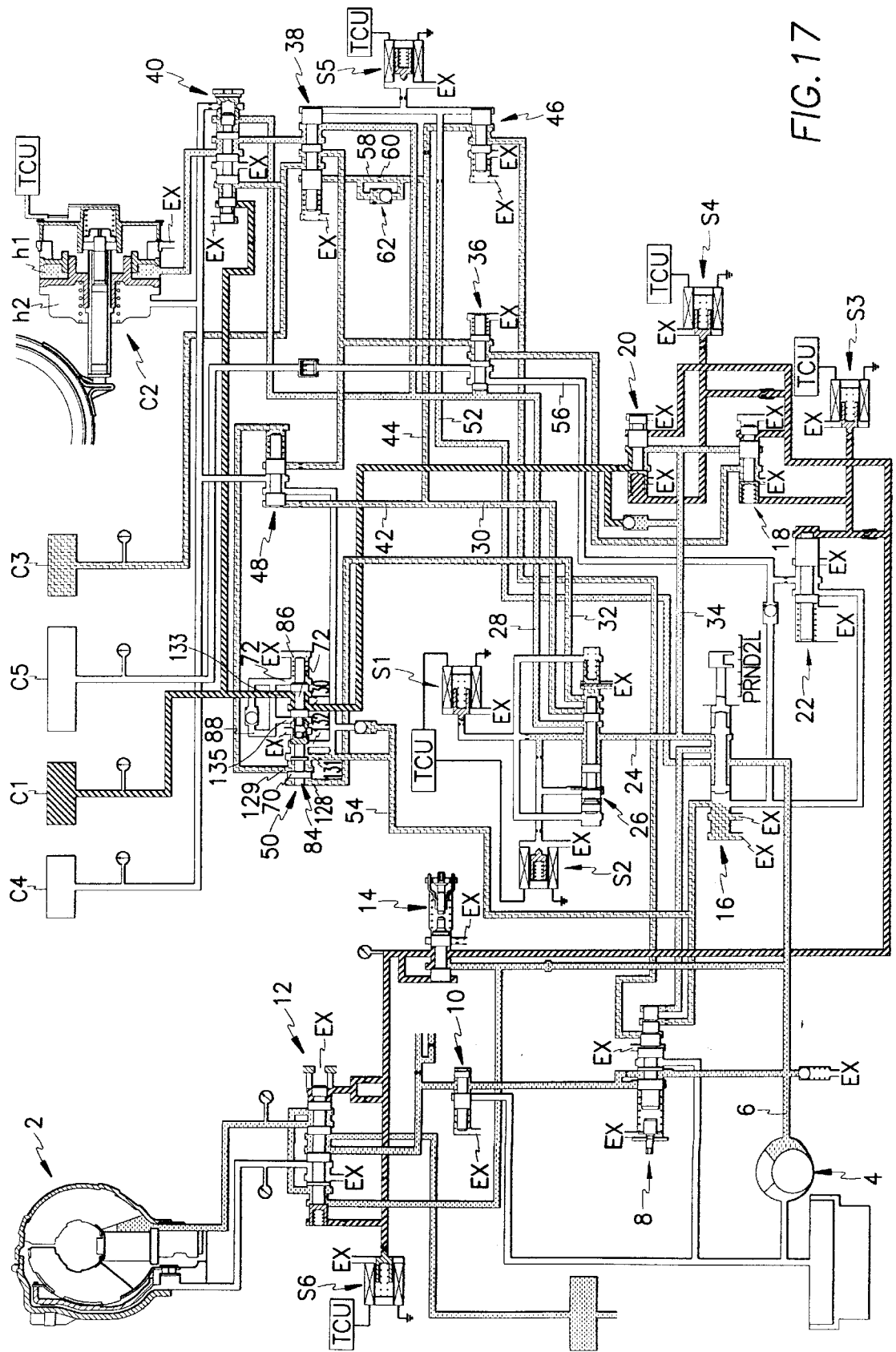
FIG. 17 is a hydraulic circuit diagram illustrating the flow of hydraulic pressure when 4-2 downshifting in the drive D range in the hydraulic control system according to the second embodiment of the present invention.

Referring to FIG. 17, when 4-2 downshifting, the second solenoid valve S2, controlled to OFF in the fourth speed, is controlled to an ON state, the hydraulic pressure supplied to third and fourth speeds is exhausted through the exhaust port EX of the shift control valve 26, and the first and second spools 70 and 72 of the 3-4 shift valve 50 and the 2-3/4-3 shift valve 48 are moved to the left (in the drawing).

Also, the third and fourth solenoid valves 18 and 20 are duty controlled, the hydraulic pressure supplied to the third friction member C3 is exhausted through the exhaust port EX of the first pressure control valve 18, and the control pressure controlled by the second pressure control valve 20 is supplied to the first friction member C1 via the 3-4 shift valve 50.

At the end of shifting in the above state, the third solenoid valve S3 is controlled to an ON state and the fourth solenoid valve S4 is controlled to OFF. As a result, the hydraulic pressure supplied to the first friction member C1 is changed to first speed pressure, realizing shifting into the second speed.

Also, in the above shifting process, the first friction member C1 and the third friction member C3 are independently controlled to realize the advantage of easy control.

Also, in the fourth speed state, as the operational pressure of the second pressure control valve 20 operates on a farthest-right of the second spool 72 of the 3-4 shift valve 50, even if the TCU discontinues operating, the second spool 72 maintains its state and hydraulic pressure is prevented from being supplied to the first friction member C1.

The previously described embodiments of the present invention have many advantages, including realizing easy control by enabling the change of line pressure in third and fourth speeds regardless of whether the damper clutch is operating.

Further, when the TCU malfunctions while driving in first and second speeds holding the transmission in the third speed, the hydraulic pressure supplied to the third friction member is interrupted, and by the operation of the first and fourth friction members, third speed is maintained, or the hydraulic pressure supplied to the first friction member from the 3-4 shift valve is interrupted, preventing the occurrence of an interlock state in the planetary gear set.

And finally, when 4-2 downshifting, as the first and third friction members are independently controlled, clutch to clutch control is possible, making control easy.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control system for automatic transmissions, comprising:

a pressure regulating means for regulating hydraulic pressure produced when oil is pumped in an oil pump;

a manual and automatic shift control means for forming a shift mode;

a hydraulic pressure control means for regulating shift quality and responsiveness for smoothly forming shift modes during shifting;

a damper clutch control means for operating a damper clutch of a torque converter; and a hydraulic pressure distribution means for supplying and distributing an appropriate amount of hydraulic pressure to a first, second, third, fourth, and fifth friction members, which operate as input and reaction members in each shift stage, the hydraulic pressure distribution means comprising:

a 1-2 shift valve, controlled by the second speed pressure of a shift control valve of the manual and automatic shift control means, the 1-2 shift valve supplying hydraulic pressure, supplied from a first pressure control valve, to a control switch valve and a 2-3/4-3 shift valve;

the control switch valve, having means for regulating the timing to which hydraulic pressure is supplied to the third friction member and a timing control line to control the second friction member, operating as a reaction member in second and fourth speeds, and when 4-2 downshifting, changes operational pressure of an operational side chamber of the second friction member to the second speed pressure, and uses operational pressure of the third friction member as control pressure of the first pressure control valve to control release pressure;

a fail-safe valve, controlled by hydraulic pressure supplied to the first, second, third, and fourth friction members and which controls the hydraulic pressure supplied to the operational side chamber of the second friction member;

a high-low pressure valve, controlled by receiving control pressure from a timing control line by the ON/OFF control of solenoid valves, and after third and fourth speed shifting is completed, supplies third speed pressure to a pressure regulator valve to allow change of line pressure;

the 2-3/4-3 shift valve, controlled by third and fourth speed pressure in third and fourth speeds and which selectively supplies hydraulic pressure received from the 1-2 shift valve and from the 3-4 shift valve in a reverse R shift range to the fourth friction member and a release side chamber of the second friction member; and a 3-4 shift valve, controlled by fourth speed pressure of the shift control valve, which in first, second, and third speeds, supplies hydraulic pressure supplied from a second pressure control valve to the first friction member, and in the fourth speed, is controlled by the supply of fourth speed pressure to the 2-3/4-3 shift valve such that the hydraulic pressure supplied to the release side chamber of the second friction member and to the fourth friction member is interrupted and, at the same time, release pressure is able to be controlled.

2. The hydraulic control system according to claim 1, wherein the 1-2 shift valve is realized through a first port, which receives second speed pressure from the shift control valve; a second port, connected to the first pressure control valve of the hydraulic pressure control means and to a reverse second control line; a third port, which supplies hydraulic pressure received from the first pressure control valve to the 2-3/4-3 shift valve, control switch valve, and fail-safe valve; and a fourth port for supplying hydraulic pressure received from the reverse second control line to the fifth friction member.

3. The hydraulic control system according to claim 1, wherein the control switch valve is comprised of a first port, controls a solenoid valve and which receives control pressure from the timing control line connected to a first speed line; a second port, which receives hydraulic pressure from the 1-2 shift valve and second and third speed lines of the shift control valve; and a third port, which selectively supplies hydraulic pressure received from the first and second ports to the fail-safe valve and the third friction member.

4. The hydraulic control system according to claim 3, wherein the solenoid valve is directly controlled by the TCU and directly controls the control switch valve and high-low pressure valve by ON/OFF control.

5. The hydraulic control system according to claim 3, wherein a third speed line communicating with the control switch valve has formed a circulation line including an orifice, and a mounted check valve for interrupting the hydraulic pressure supplied to the control switch valve.

6. The hydraulic control system according to claim 1, wherein the fail-safe valve is comprised of a first and second ports, communicating with the control switch valve and the second port also receives second speed pressure; a third port, connected to a second speed line of the shift control valve; a fourth port, which receives part of the hydraulic pressure supplied to the first friction member; a fifth port, receiving part of the hydraulic pressure supplied to the release side chamber of the second friction member and to the fourth friction member; and a sixth port, which supplies the hydraulic pressure supplied from the control switch valve to the operational side chamber of the second friction member.

7. The hydraulic control system of claim 1, wherein the high-low pressure valve is comprised of a first port, communicating with the timing control line; a second port, which receives third speed pressure by communicating with the third speed line; and a third port, supplying the third speed pressure, received as in the above, to the pressure regulator valve.

8. The hydraulic control system according to claim 1, wherein the 2-3/4-3 shift valve is comprised of a first port connected to the third speed line; a second port connected to a fourth speed line through the 3-4 shift valve; a third port, communicating with the 1-2 shift valve to receive hydraulic pressure; a fourth port, communicating with the reverse first control line; and a fifth port, communicating with and receiving hydraulic pressure from the release side chamber of the second friction member and the fourth friction member.

9. The hydraulic control system according to claim 1, wherein the 3-4 shift valve is comprised of a first port for receiving hydraulic pressure from the fourth speed line; a second port to supply the hydraulic pressure received from the fourth spaced line to the 2-3/4-3 shift valve; a third port, communicating with the second pressure control valve; a fourth and fifth ports for supplying hydraulic pressure received from the reverse first control line to the 2-3/4-3 shift valve; and a sixth port, which supplies hydraulic pressure received from the second pressure control valve to the first friction member.

10. The hydraulic control system according to claim 1, wherein the 3-4 shift valve, controlled by fourth speed pressure, supplies the hydraulic pressure supplied to the second pressure control valve to the first friction member in first, second, and third speeds; when 3-4 shifting, directly exhausts the hydraulic pressure supplied to the second friction member; and when 3-4 and 3-2 shifting, exhausts the hydraulic pressure, supplied to the release side chamber of the second friction member and the fourth friction member, through the manual valve via the 2-3/4-3 shift valve and the reverse first control line.

11. The hydraulic control system according to claim 10, wherein the 3-4 shift valve is comprised of a first and second ports for supplying hydraulic pressure received from the fourth speed line to the 2-3/4-3 shift valve; a third port, communicating with the second pressure control valve; a fourth and fifth ports, communicating with the reverse first control line and, at the same time, with the 2-3/4-3 shift valve; a sixth port, for supplying hydraulic pressure received from the second pressure control valve to the first friction member; and a seventh and eighth ports of a circulation line which circulates the hydraulic pressure supplied to the sixth port receiving hydraulic pressure from the first friction member.

* * * * *